(12) United States Patent
Chu et al.

(10) Patent No.: US 10,082,998 B2
(45) Date of Patent: Sep. 25, 2018

(54) ELECTRONIC DEVICE AND INFORMATION SHARING METHOD THEREOF

(71) Applicant: Samsung Electronics Co., Ltd., Suwon-si, Gyeonggi-do (KR)

(72) Inventors: Seyoup Chu, Daegu (KR); Yanghee Kwon, Seoul (KR); Youngrim Kim, Seoul (KR); Sunyoung Park, Seoul (KR); Yeongseong Yoon, Seoul (KR); Jingoo Lee, Seoul (KR); Wansoo Lim, Seongnam-si (KR); Byeongwoo Choi, Seongnam-si (KR); Hyunsik Choi, Suwon-si (KR); Hyunsuk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 15/234,505

(22) Filed: Aug. 11, 2016

(65) Prior Publication Data
US 2017/0046111 A1 Feb. 16, 2017

(30) Foreign Application Priority Data
Aug. 12, 2015 (KR) .................. 10-2015-0114130

(51) Int. Cl.
*H04L 12/66* (2006.01)
*G06F 3/14* (2006.01)
(Continued)

(52) U.S. Cl.
CPC ............ *G06F 3/1454* (2013.01); *G06F 3/013* (2013.01); *H04L 65/1069* (2013.01);
(Continued)

(58) Field of Classification Search
None
See application file for complete search history.

(56) References Cited

U.S. PATENT DOCUMENTS

2002/0054028 A1 5/2002 Uchida et al.
2011/0275391 A1* 11/2011 Lee ..................... H04M 1/7253
455/500
(Continued)

FOREIGN PATENT DOCUMENTS

KR 10-2002-0008034 A 1/2002
KR 10-2004-0083241 A 10/2004

*Primary Examiner* — Minh-Trang Nguyen
(74) *Attorney, Agent, or Firm* — Jefferson IP Law, LLP

(57) ABSTRACT

An electronic device for sharing images with another electronic device through bidirectional communication and providing feedback information based on the information concerning the images and an information sharing method of the electronic device is provided. The electronic device includes a user interface, a communication circuit configured to connect the electronic device to at least one external electronic device though at least one of first and second communication channels, a memory, and a processor which is electrically connected to the user interface, the communication circuit, and the memory, wherein the memory stores instructions for the processor to establish a communication connection with the external electronic device through the first and second communication channels, transmit contents to the external electronic device through the second communication channel, receive at least one of input information made to the contents at the external electronic device and status information of the external electronic device through the second communication channel, generate feedback information related to the contents based on at least one of the input information and feedback information, and output the feedback information through the user interface.

20 Claims, 35 Drawing Sheets

(51) Int. Cl.
*H04L 29/06* (2006.01)
*H04N 5/232* (2006.01)
*G06F 3/01* (2006.01)
*H04N 1/00* (2006.01)
G06F 3/0484 (2013.01)
G06F 3/0481 (2013.01)

(52) U.S. Cl.
CPC ...... *H04L 65/1089* (2013.01); *H04L 65/4015* (2013.01); *H04N 1/00214* (2013.01); *H04N 5/23206* (2013.01); *H04N 5/23216* (2013.01); *H04N 5/23293* (2013.01); *G06F 3/04817* (2013.01); *G06F 3/04845* (2013.01); *G09G 2354/00* (2013.01)

(56) References Cited

U.S. PATENT DOCUMENTS

2014/0340308 A1\* 11/2014 Yeh .......................... G06F 3/038
                                                              345/157
2016/0142913 A1\* 5/2016 Ghosh ................... H04W 12/06
                                                              726/5

\* cited by examiner

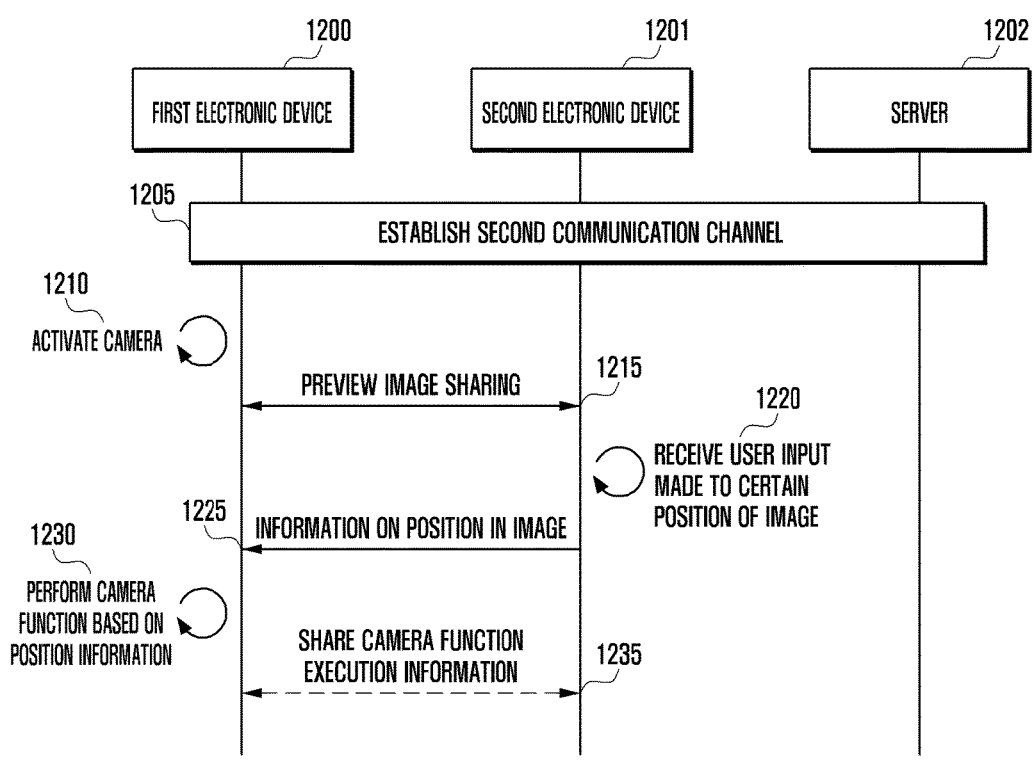

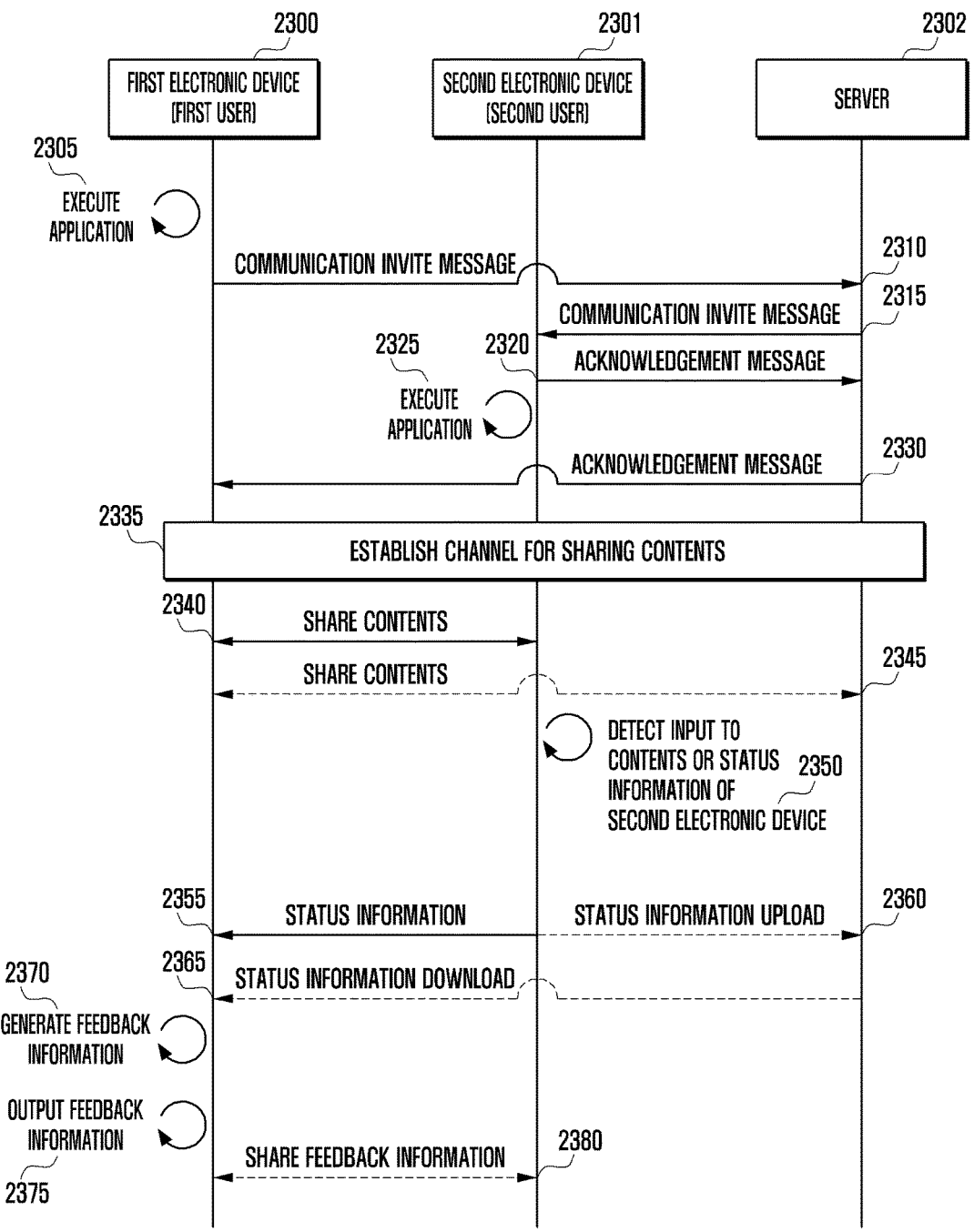

ELECTRONIC DEVICE AND INFORMATION SHARING METHOD THEREOF

CROSS-REFERENCE TO RELATED APPLICATION(S)

This application claims the benefit under 35 U.S.C. § 119(a) of a Korean patent application filed on Aug. 12, 2015 in the Korean Intellectual Property Office and assigned Serial No. 10-2015-0114130, the entire disclosure of which is hereby incorporated by reference.

TECHNICAL FIELD

The present disclosure relates to an electronic device for sharing images with another electronic device through bidirectional communication and providing feedback information based on the information concerning the images and an information sharing method of the electronic device.

BACKGROUND

An electronic device such as a bidirectional communication-enabled legacy mobile terminal is designed to communicate voice signals with a counterpart electronic device.

In the case of being required to share certain contents or information with the counterpart during the bidirectional communication, the user of the electronic device may send the counterpart the corresponding contents by means of a short message service (SMS) application or a third party application.

The above information is presented as background information only to assist with an understanding of the present disclosure. No determination has been made, and no assertion is made, as to whether any of the above might be applicable as prior art with regard to the present disclosure.

SUMMARY

The bidirectional communication-based screen sharing function according to the related art has a drawback in that it is difficult for the user of the electronic device who has transmitted contents to a counterpart electronic device to recognize how the user of the counterpart electronic device reacts to the contents. For example, it is difficult for the user of the electronic device to determine whether the user of the counterpart electronic device is looking at the screen shared between the two electronic devices. In this case, the user of the electronic device may not present the contents to the counterpart user effectively.

Aspects of the present disclosure are to address at least the above-mentioned problems and/or disadvantages and to provide at least the advantages described below. Accordingly, an aspect of the present disclosure is to provide electronic devices and screen sharing methods thereof that are capable of overcoming the above problem.

In accordance with an aspect of the present disclosure, an electronic device is provided. The electronic device includes a user interface, a communication circuit configured to connect the electronic device to at least one external electronic device though at least one of first and second communication channels, a memory, and a processor which is electrically connected to the user interface, the communication circuit, and the memory, wherein the memory stores instructions for the processor to establish a communication connection with the external electronic device through the first and second communication channels, transmit contents to the external electronic device through the second communication channel, receive at least one of input information made to the contents at the external electronic device and status information of the external electronic device through the second communication channel, generate feedback information related to the contents based on at least one of the input information and feedback information, and output the feedback information through the user interface.

In accordance with another aspect of the present disclosure, an electronic device is provided. The electronic device includes a user interface configured to display at least one screen, a communication circuit configured to connect the electronic device to at least one external electronic device through at least one of a first and a second communication channels, a memory, and a processor which is electrically connected to the user interface, the communication circuit, and the memory, wherein the memory stores instructions for the processor to establish a communication connection with the external electronic device through the first and second communication channel, receive contents from the external electronic device through the second communication channel, output the contents through the user interface, and transmit at least one of input information made to the contents at the external electronic device and status information of the external electronic device through the second communication channel.

In accordance with another aspect of the present disclosure, an electronic device is provided. The electronic device includes a communication circuit configured to establish a communication channel for sharing contents between a first external electronic device and a second external electronic device, a memory, and a processor that is electrically connected with the communication circuit and the memory, wherein the memory stores instructions for the processor to control receiving a request for establishing the communication channel from the first external electronic device, forwarding the request to the second external electronic device, relaying an acknowledgement message received from the second external electronic device in response to the request to the first external electronic device, and establishing the communication channel.

In accordance with another aspect of the present disclosure, an information sharing method of an electronic device is provided. The information sharing method includes setting a communication connection to an external electronic device through a first and a second communication channel, transmitting contents to the external electronic device through the second communication channel, receiving at least one of input information made to the contents at the external electronic device and status information of the external electronic device through the second communication channel, and generating and outputting feedback information related to the contents based on at least one of the input information and feedback information.

In accordance with another aspect of the present disclosure, an information sharing method of an electronic device is provided. The information sharing method includes setting a communication connection with an external electronic device through a first and a second communication channel, receiving contents from the external electronic device through the second communication channel, outputting the received contents, and transmitting at least one of information input to the electronic device in association with the contents and status information of the electronic device to the external electronic device through the second communication channel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a signal flow diagram illustrating a procedure of sharing a camera's preview image taken by the first electronic device with the second electronic device according to various embodiments of the present disclosure;

FIG. 23 is a signal flow diagram illustrating a procedure for establishing a second communication connection without a previously established first communication connection between a first and a second electronic device according to various embodiments of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 4:
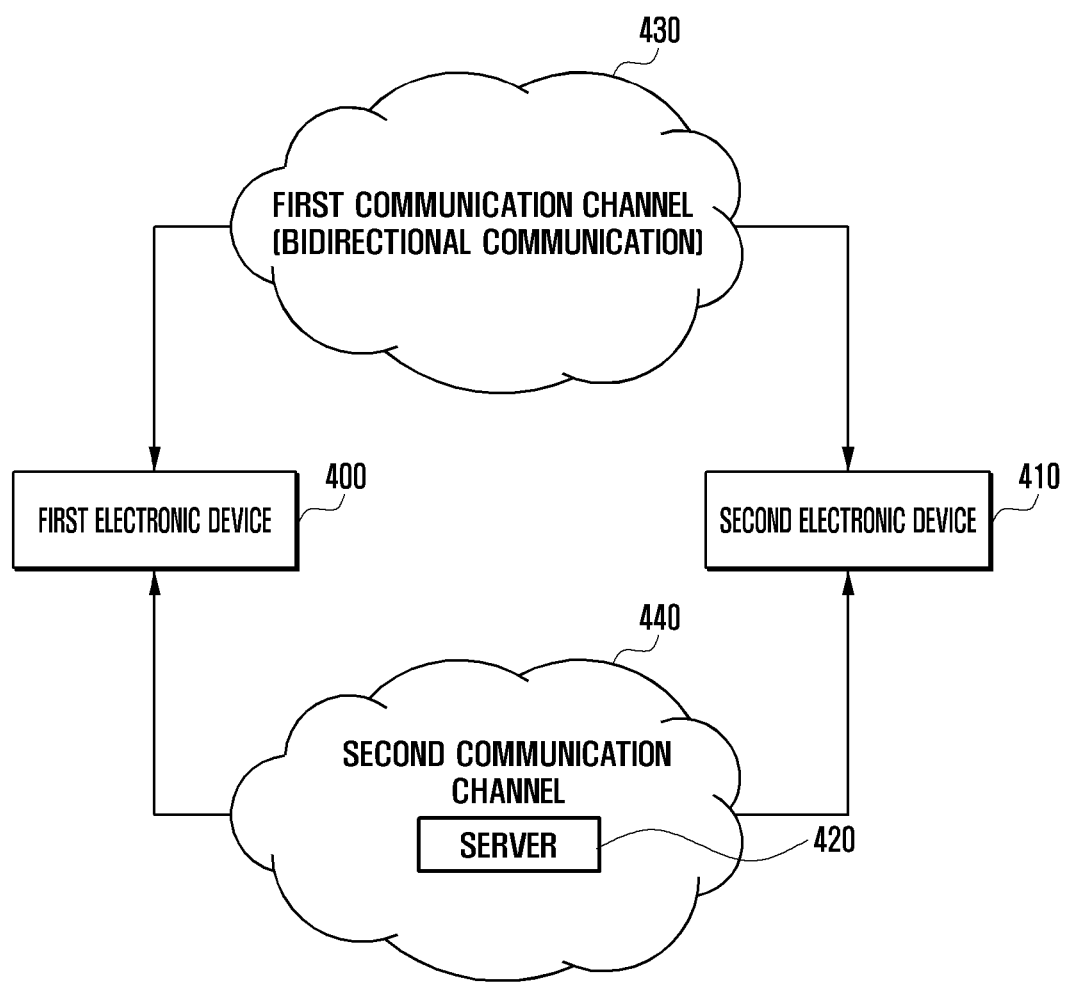
FIG. 4 is a diagram illustrating a communication system according to various embodiments of the present disclosure.

In the following description, the term "bidirectional communication" may denote the data communication between two electronic devices through a one of two existing communication channels. In the case of FIG. 4, the bidirectional communication through the first communication channel 430 may be a voice call communication. Meanwhile, the bidirectional communication through the second communication channel 440 may be a data communication, the second communication channel 440 being established via a server. The first and second communication channels 430 and 440 may be the communication channels established by different communication protocols. The first communication channel 430 may be established by a first communication protocol, and the second communication channel 440 may be established by a second communication protocol.

In the following description, the term "content" may denote every kind of object displayed on a user interface (e.g., display 160) of the electronic device 101. For example, the content may include various objects such as a home screen, an execution screen, a menu, an icon, a video, a still image, a motion image, and a thumbnail image. The content may also be configured in the form of a combination of at least one of letters, numbers, images, and user interface (UI) items. The content may also include a preview image provided by a camera.

In the following description, the term "See What I See (SWIS) communication" may denote an operation of sharing contents between electronic devices through the second communication channel. Accordingly, the SWIS communication link may denote the second communication link, and the SWIS communication channel may denote the second communication channel 440. The SWIS communication may be provided in the form of data communication through one of second generation (2G), third generation (3G), fourth generation (4G), and fifth generation (5G) mobile communication networks.

The term "include" or "may include" which may be used in describing various embodiments of the present disclosure refers to the existence of a corresponding disclosed function, operation or component which may be used in various embodiments of the present disclosure and does not limit one or more additional functions, operations, or components.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component (e.g., a first component) is "coupled to" or "connected to" another component (e.g., a second component), the component may be directly coupled to the other component, or coupled to the other component through a new component (e.g., a third component). In contrast, when it is stated that a component (e.g., a first component) is "directly coupled to" or "directly connected to" another component (e.g., a second component), a new component (e.g., a third component) does not exist between the component and the other component.

In the following description, the expression "configured to ~" may be interchangeably used with the expressions "suitable for ~", "having a capability of ~", "changed to ~", "made to ~", "capable of ~", and "designed for" in hardware or software. The expression "device configured to ~" may denote that the device is "capable of ~" with other devices or components. For example, when it is mentioned that a processor is configured to perform A, B, and C, it may be understood that the processor (e.g., central processing unit (CPU) and application processor (AP)) is capable of performing corresponding operations by executing software programs dedicated to the corresponding operations.

The terms used in describing various embodiments of the present disclosure are only examples for describing a specific embodiment but do not limit the various embodiments of the present disclosure. Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

According to various embodiments of the present disclosure, examples of the electronic device may include a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an Moving Picture Experts Group phase 1 or phase 2 (MPEG-1 or MPEG-2) audio layer 3 (MP3) player, a medical device, a camera, and a wearable device. Examples of the wearable device may include an accessory type device (such as, watch, ring, bracelet, ankle bracelet, necklace, glasses, contact lens, and head-mount device (HMD), a textile or clothes type device (such as electronic clothes), a body-attached type (such as skin pad and tattoo), and a bio-implemented type.

According to an embodiment, examples of the electronic device may include a television, a digital versatile disc (DVD) player, an audio player, a refrigerator, an air conditioner, a cleaner, an oven, a microwave oven, a laundry machine, an air purifier, a set-top box, a home automation control panel, a security control panel, a media box (such as Samsung HomeSync™, apple TV™, and google TV™), a game console (such as Xbox™ and PlayStation™), an electronic dictionary, an electronic key, a camcorder, and an electronic frame.

According to an embodiment, examples of the electronic device may include a medical device (such as portable medical sensors (including glucometer, heart rate sensor, tonometer, and body thermometer), magnetic resonance angiography (MRA) device, magnetic resonance imaging (MRI) device, computed tomography (CT) device, camcorder, and microwave scanner), a navigation device, a global navigation satellite system (GNSS), an event data recorder (EDR), a flight data recorder (FDR), an automotive infotainment device, marine electronic equipment (such as marine navigation system and gyro compass), aviation electronics (avionics), an automotive head unit, an industrial or household robot, an automatic teller machine (ATM), a point of sales (POS) terminal, and an internet-of-things (IoT) device (such as electric bulb, sensor, sprinkler system, fire alarm system, temperature controller, street lamp, toaster, fitness equipment, hot water tank, heater, and boiler).

According to an embodiment of the present disclosure, examples of the electronic device may include furniture, a building/structure, a part of a vehicle, an electronic board, an electronic signature receiving device, a projector, and a sensor (such as water, electricity, gas, and electric wave meters). According to various embodiments of the present disclosure, the electronic device may be flexible or a combination of at least two of the aforementioned devices.

According to an embodiment of the present disclosure, the electronic device is not limited to the aforementioned devices. In the present disclosure, the term "user" may denote a person who uses the electronic device or a device (e.g., artificial intelligent electronic device) which uses the electronic device.

Figure 1:
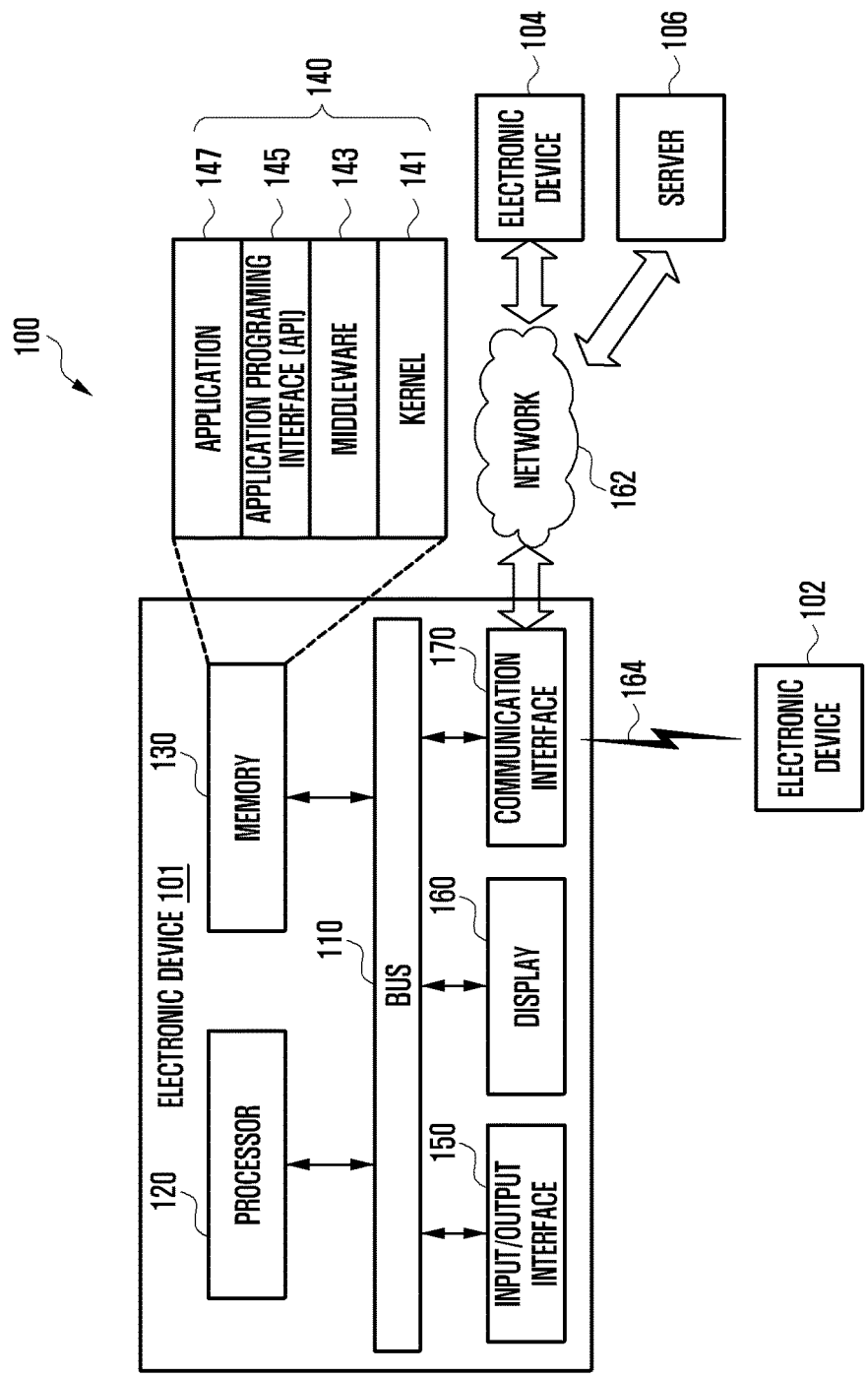
FIG. 1 is a block diagram illustrating a configuration of an electronic device in a network environment according to various embodiments of the present disclosure.

FIG. 1 is a block diagram illustrating a configuration of an electronic device in a network environment according to various embodiments of the present disclosure.

Referring to FIG. 1, an electronic device 101, in a network environment 100, includes a bus 110, a processor 120, a memory 130, an input/output interface 150, a display 160, and a communication interface 170. According to some embodiment, the electronic device 101 may omit at least one of the components or further include another component.

The bus 110 may be a circuit connecting the above described components and transmitting communication (e.g., a control message) between the above described components.

The processor 120 may include one or more of CPU, AP or communication processor (CP). For example, the processor 120 may control at least one component of the electronic device 101 and/or execute calculation relating to communication or data processing.

The memory 130 may include volatile and/or non-volatile memory. For example, the memory 130 may store command or data relating to at least one component of the electronic device 101. According to some embodiment, the memory may store software and/or program 140. For example, the program 140 may include a kernel 141, middleware 143, an application programming interface (API) 145, and/or an application 147 and so on. At least one portion of the kernel 141, the middleware 143 and the API 145 may be defined as operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 may be used, to the application 147.

The API 145 is an interface by which the application 147 may control a function provided by the kernel 141 or the middleware 143 and includes, for example, at least one interface or function (e.g., command) for a file control, a window control, image processing, or a character control.

The input/output interface 150 may be interface to transmit command or data inputted by a user or another external device to another component(s) of the electronic device 101. Further, the input/output interface 150 may output the command or data received from another component(s) of the electronic device 101 to the user or another external device.

The display 160 may include, for example, liquid crystal display (LCD), light emitting diode (LED), organic LED (OLED), or micro electro mechanical system (MEMS) display, or electronic paper display. The display 160 may display, for example, various contents (text, image, video, icon, or symbol, and so on) to a user. The display 160 may include a touch screen, and receive touch, gesture, approaching, or hovering input using a part of body of the user.

The communication interface 170 may set communication of the electronic device 101 and external device (e.g., a first external device 102, a second external device 104, or a server 106). For example, the communication interface 170 may be connected with a network 162 through wireless communication 164 or wire communication and communicate with the external device (e.g., a second external device 104 or server 106).

Wireless communication may use, as cellular communication protocol, at least one of long-term evolution (LTE), LTE advance (LTE-A), code division multiple access (CDMA), wideband CDMA (wideband CDMA), universal mobile telecommunications system (UMTS), wireless broadband (WiBro), global System for mobile communications (GSM), and the like, for example. A short-range communication 164 may include, for example, at least one of Wi-Fi, Bluetooth (BT), near field communication (NFC), magnetic secure transmission or near field magnetic data stripe transmission (MST), and global navigation satellite system (GNSS), and the like. The GNSS may include at least one of, for example, a global positioning system (GPS), a Global navigation satellite system (Glonass), a Beidou Navigation Satellite System (hereinafter, referred to as "Beidou"), and Galileo (European global satellite-based navigation system). Hereinafter, the "GPS" may be interchangeably used with the "GNSS" in the present disclosure. Wired communication may include, for example, at least one of universal serial bus (USB), high definition multimedia interface (HDMI), recommended standard-232 (RS-232), plain old telephone service (POTS), and the like.

The network 162 may include telecommunication network, for example, at least one of a computer network (e.g., local area network (LAN) or wide area network (WAN), internet, and a telephone network.

Each of the first external device 102 and the second external device 104 may be same type or different type of device with the electronic device 101. According to some embodiment, the server 106 may include one or more group of servers. According to various embodiments, at least one portion of executions executed by the electronic device may be performed by one or more electronic devices (e.g., external electronic device 102, 104, or server 106). According to some embodiments, when the electronic device 101 should perform a function or service automatically, the electronic device 101 may request performing of at least one function to another device (e.g., external electronic device 102, 104, or server 106). For the above, cloud computing technology, distributed computing technology, or client-server computing technology may be used, for example.

Figure 2:
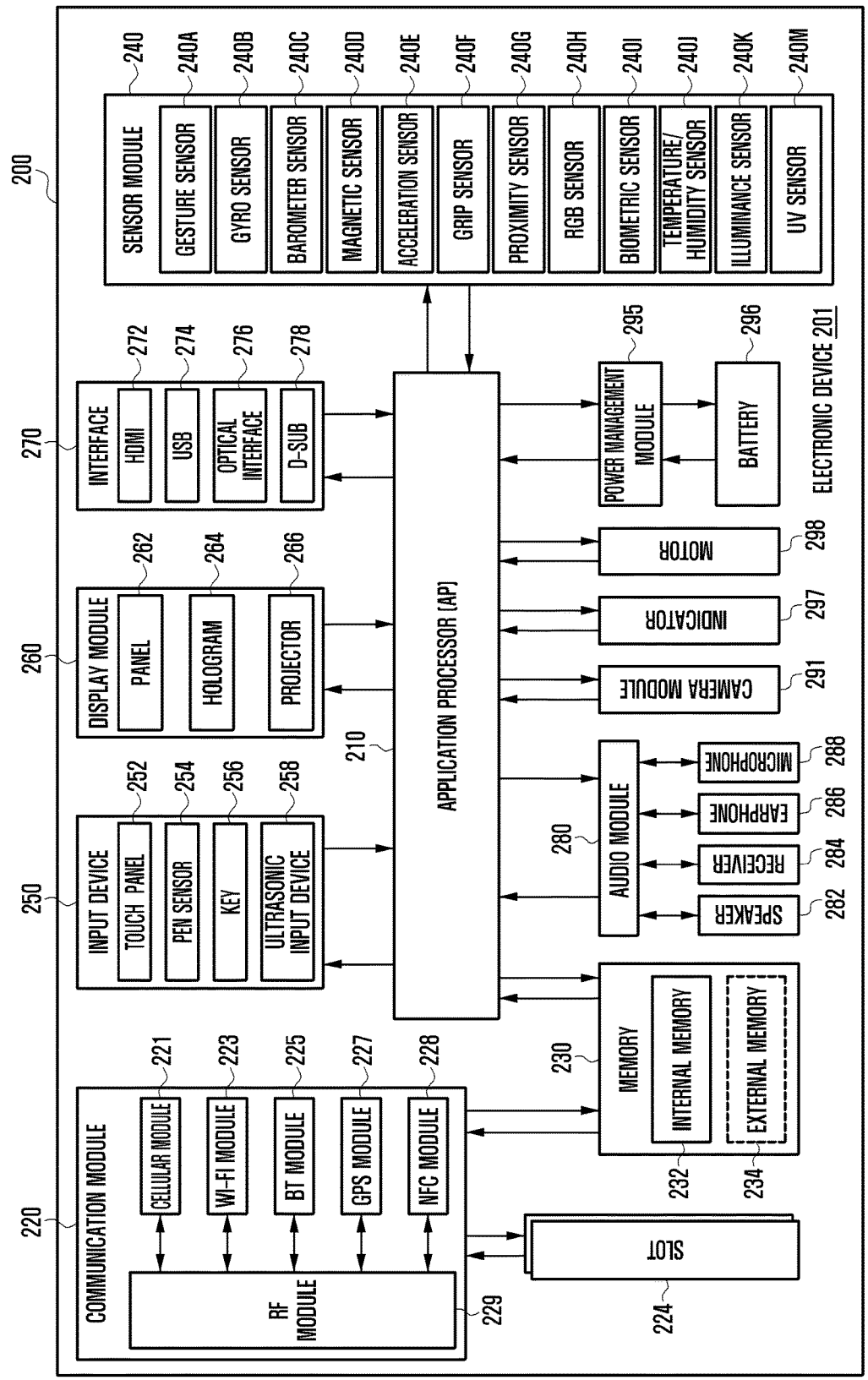
FIG. 2 is a block diagram illustrating a configuration of an electronic device according to various embodiments of the present disclosure.

FIG. 2 is a block diagram illustrating a configuration of an electronic device according to various embodiments of the present disclosure.

Referring to FIG. 2, an electronic device 201 may configure, for example, a whole or a part of the electronic device 101 illustrated in FIG. 1. The electronic device 201 includes one or more APs 210, a communication module 220, a subscriber identification module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an OS or an application program so as to control a plurality of hardware or software component elements connected to the AP 210 and execute various data processing and calculations including multimedia data. The AP 210 may be implemented by, for example, a system on chip (SoC). According to an embodiment, the processor 210 may further include a graphics processing unit (GPU) and/or image signal processor (ISP). The AP 210 may include at least one portion of components illustrated in FIG. 2 (e.g., a cellular module 221). The AP 210 may load command or data received from at least one of another component (e.g., non-volatile memory), store various data in the non-volatile memory.

The communication module 220 may include same or similar components with the communication interface 170 of FIG. 1. The communication module 220, for, example, may include the cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an internet service through a communication network (e.g., LTE, LTE-A, CDMA, WCDMA, UMTS, WiBro, GSM and the like). Further, the cellular module 221 may distinguish and authenticate electronic devices within a communication network by using a SIM (e.g., the SIM card 224). According to an embodiment, the cellular module 221 performs at least some of the functions which may be provided by the AP 210. For example, the cellular module 221 may perform at least some of the multimedia control functions. According to an embodiment, the cellular module 221 may include a CP.

Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are at least some (e.g., two or more) of the cellular module 221, the Wi-Fi module 223, the BT module 225, the GPS module 227, and the NFC module 228 may be included in one integrated chip (IC) or one IC package according to one embodiment. For example, at least some (e.g., the CP corresponding to the cellular module 221 and the Wi-Fi processor corresponding to the Wi-Fi module 223) of the processors corresponding to the cellular module 221, the Wi-Fi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a power amp module (PAM), a frequency filter, a low noise amplifier (LNA) and the like. Further, the RF module 229 may further include a component for transmitting/receiving electronic waves over a free air space in wireless communication, for example, a conductor, a conducting wire, and the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment.

The SIM card 224 is a card including a SIM and may be inserted into a slot formed in a particular portion of the electronic device. The SIM card 224 includes unique identification information (e.g., integrated circuit card identifier (ICCID)) or subscriber information (e.g., international mobile subscriber identity (IMSI).

The memory 230 (e.g., memory 130) may include an internal memory 232 or an external memory 234. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like).

According to an embodiment, the internal memory 232 may be a solid state drive (SSD). The external memory 234 may further include a flash drive, for example, a compact flash (CF), a secure digital (SD), a micro-SD, a mini-SD, an extreme digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which may detect an acoustic wave by a microphone (e.g., a microphone 288) of the electronic device 201 through an input means generating an ultrasonic signal to identify data and may perform wireless recognition. According to an embodiment, the electronic device 201 receives a user input from an external device (e.g., computer or server) connected to the electronic device 201 by using the communication module 220.

The display 260 (e.g., display 160) includes a panel 262, a hologram device 264, and a projector 266. The panel 262 may be, for example, a LCD or an active matrix OLED (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 includes, for example, a HDMI 272, an USB 274, an optical interface 276, and a D-subminiature (D-sub) 278. The interface 270 may be included in, for example, the communication interface 170 illustrated in FIG. 1. Additionally or alternatively, the interface 290 may include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 and the like.

The camera module 291 is a device which may photograph a still image and a video. According to an embodiment, the camera module 291 may include one or more image sensors (e.g., a front sensor or a back sensor), an ISP (not shown) or a flash (e.g., an LED or xenon lamp).

The power managing module 295 manages power of the electronic device 201. Although not illustrated, the power managing module 295 may include, for example, a power management integrated circuit (PMIC), a charger IC, or a battery or fuel gauge.

The PMIC may be mounted to, for example, an integrated circuit or a SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (e.g., AP 210) of the electronic device 201, for example, a booting status, a message status, a charging status and the like. The motor 298 converts an electrical signal to a mechanical vibration. Although not illustrated, the electronic device 201 may include a processing unit (e.g., GPU) for supporting a module TV. The processing unit for supporting the mobile TV may process, for example, media data according to a standard of digital multimedia broadcasting (DMB), digital video broadcasting (DVB), media flow and the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
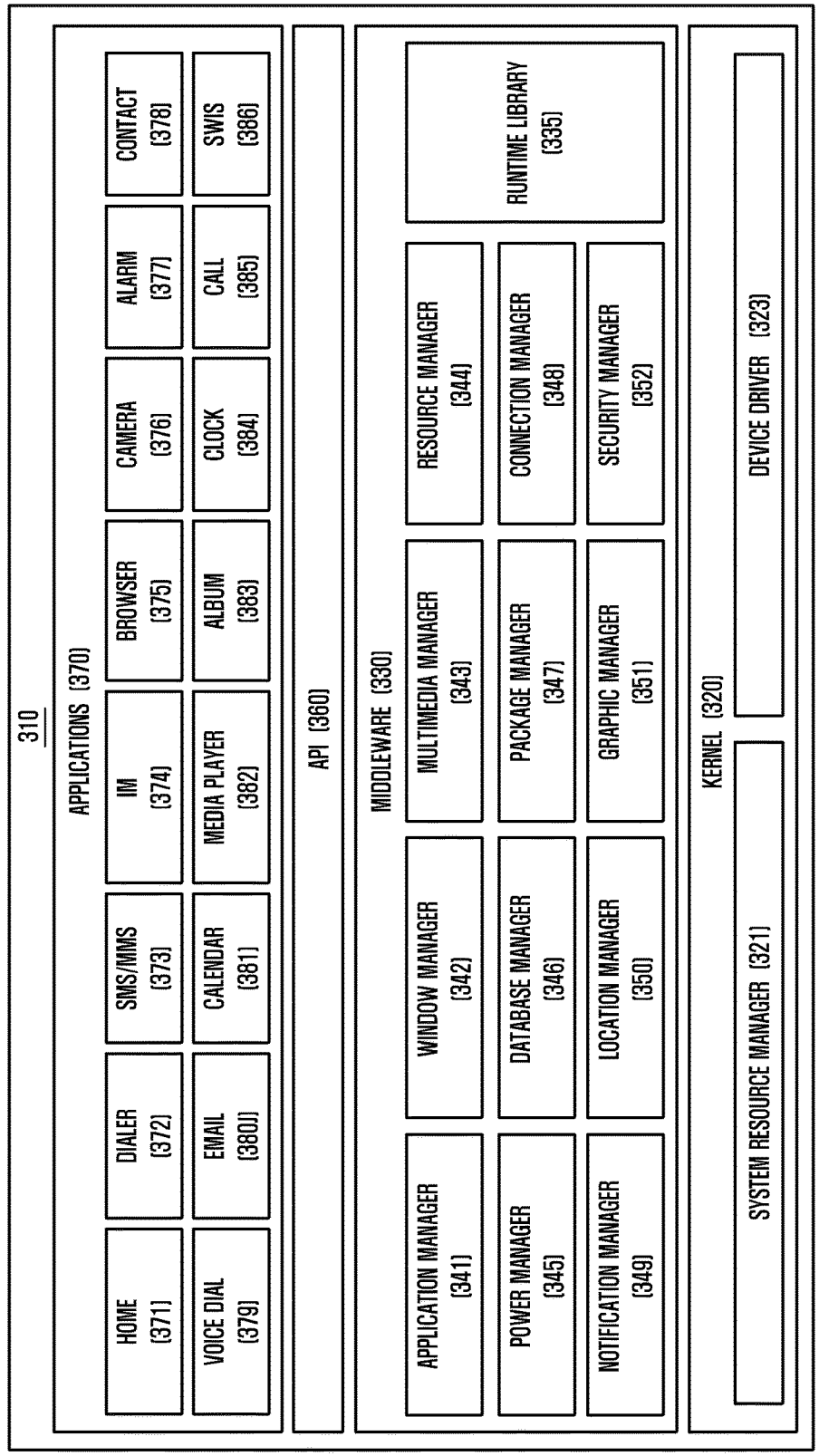
FIG. 3 is a block diagram illustrating a configuration of a program module according to various embodiments of the present disclosure.

FIG. 3 is a block diagram illustrating a configuration of a program module according to various embodiments of the present disclosure.

Referring to FIG. 3, a programming module 310 may be included, e.g. stored, in the electronic apparatus 100, e.g. the memory 130, as illustrated in FIG. 1. At least a part of the programming module 310 (e.g., program 140) may be configured by software, firmware, hardware, and/or combinations of two or more thereof. The programming module 310 may include an OS that is implemented in hardware, e.g., the hardware 200 to control resources related to an electronic device, e.g., the electronic device 100, and/or various applications. e.g., applications 370, driven on the OS. For example, the OS may be Android, iOS, Windows, Symbian, Tizen, Bada, and the like.

As illustrated in FIG. 3, the programming module 310 may include a kernel 320, middleware 330, an API 360, and the applications 370 (e.g., application 147). At least part of the program module 310 may be preloaded on the electronic device or downloaded from a server (e.g., an electronic device 102, 104, server 106, etc.).

The kernel 320, which may be like the kernel 141, may include a system resource manager 321 and/or a device driver 323. The system resource manager 321 may include, for example, a process manager, a memory manager, and a file system manager. The system resource manager 321 may control, allocate, and/or collect system resources. The device driver 323 may include, for example, a display driver, a camera driver, a BT driver, a shared memory driver, a USB driver, a keypad driver, a Wi-Fi driver, and an audio driver. Further, according to an embodiment, the device driver 323 may include an inter-process communication (IPC) driver (not illustrated).

The middleware 330 may include a plurality of modules implemented in advance for providing functions commonly used by the applications 370. Further, the middleware 330 may provide the functions through the API 360 such that the applications 370 may efficiently use restricted system resources within the electronic apparatus. For example, as shown in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment, the runtime library 335 may perform an input/output, memory management, and/or a function for an arithmetic function.

The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of at least one of the applications 370.

The power manager 345 may manage a battery and/or power, while operating together with a basic input/output system (BIOS), and may provide power information used for operation. The database manager 346 may manage generation, search, and/or change of a database to be used by at least one of the applications 370. The package manager 347 may manage installation and/or an update of an application distributed in a form of a package file.

For example, the connectivity manager 348 may manage wireless connectivity such as Wi-Fi or BT. The notification manager 349 may display and/or notify of an event, such as an arrival message, a promise, a proximity notification, and the like, in such a way that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. According to an embodiment, when an electronic apparatus, e.g., the electronic apparatus 100, has a telephone call function, the middleware 330 may further include a telephony manager (not illustrated) for managing a voice and/or video communication function of the electronic apparatus.

The middleware 330 may generate and use a new middleware module through various functional combinations of the aforementioned internal element modules. The middleware 330 may provide modules specialized according to types of OSs in order to provide differentiated functions. Further, the middleware 330 may dynamically remove some of the existing elements and/or add new elements. Accordingly, the middleware 330 may exclude some of the elements described in the various embodiments of the present disclosure, further include other elements, and/or substitute the elements with elements having a different name and performing a similar function.

The API 360, which may be similar to the API 145, is a set of API programming functions, and may be provided with a different configuration according to the OS. For example, in a case of Android or iOS, one API set may be provided for each of platforms, and in a case of Tizen, two or more API sets may be provided.

The applications 370, which may include an application similar to the application 147, may include, for example, a preloaded application and/or a third party application. The applications 370 may include a home application 371 a dialer application 372, a SMS/multimedia messaging service (MMS) application 373, an instant messaging (IM) application 374, a browser application 375, a camera application 376, an alarm application 377, a contact application 378, a voice dial application 379, an email application 380, a calendar application 381, a media player application 382, an album application 383, a clock application 384, a call application 385 and an SWIS application 386. However, the present embodiment is not limited thereto, and the applications 370 may include any other similar and/or suitable application.

At least a part of the programming module 310 may be implemented by commands stored in computer-readable storage media. When the commands are executed by at least one processor, e.g. the processor 210, at least one processor may perform functions corresponding to the commands. The computer-readable storage media may be, for example, the memory 230. At least a part of the programming module 310 may be implemented, e.g. executed, by, for example, the processor 210. At least a part of the programming module 310 may include, for example, a module, a program, a routine, a set of instructions and/or a process for performing at least one function.

The titles of the aforementioned elements of the programming module, e.g. the programming module 310, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

The memory 130 may include volatile and/or non-volatile memory. For example, the memory 130 may store command or data relating to at least one component of the electronic device 101. According to some embodiment, the memory may store software and/or program 140. For example, the program 140 may include a kernel 141, middleware 143, an API 145, and/or an application 147 and so on. At least one portion of the kernel 141, the middleware 143 and the API 145 may be defined as OS.

According to an embodiment, the memory 130 may include at least one of a call application, a second communication-related application (e.g., SWIS application) or SWIS agent. According to various embodiments, the call application has a capability for supporting the first communication connection, the second communication-related application (e.g., SWIS application) has a capability for supporting the second communication connection (e.g., SWIS communication connection). The SWIS agent to support the functions related to operating of second communication-related application (e.g., SWIS application).

According to various embodiments, the memory 130 may include at least one of algorithm, routines, instructions related to sharing contents through second communication (e.g., SWIS communication) channel. According to various embodiments, the memory 130 may include an instructions for instructing respective operations of the processor 120, referred to in the description under the control of the processor 120.

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of OSs.

According to various embodiments, at least part of the program module 310 can be implemented with software, firmware, hardware, or any combination of two or more of them. At least part of the program module 310 can be implemented (e.g., executed) by a processor (e.g., processor 210). At least part of the programming module 310 may include modules, programs, routines, sets of instructions or processes, etc., in order to perform one or more functions.

FIG. 4 is a diagram illustrating a communication system according to various embodiments of the present disclosure.

Referring to FIG. 4, the communication system includes a first electronic device 400, a second electronic device 410, a server 420, a first communication channel 430 and a second communication channel 440.

The first and second electronic devices 400 and 410 may be configured in the same configuration as the electronic device 101. For example, the first and second electronic devices 400 and 410 may include at least part of the configuration of the electronic device 101. According to various embodiments, the first electronic device 400 may be the electronic device 101 for use by a calling party of voice communication or the second communication (e.g., SWIS communication), and the second electronic device 410 may be the electronic device 101 for use by a called part of voice communication or the SWIS communication. The first electronic device 400 may be an external electronic device in view of the second electronic device 410, and the second electronic device 410 may be an external device in view of the first electronic device 400.

The server 420 may establish the second communication channel 440 for the second communication (e.g., SWIS communication) and perform various operations required for establishing the second communication channel 440 and relaying signals between the first and second electronic devices 400 and 410. For example, the server 420 may check the identifiers such as IDs of the first electronic device 400 and/or the second electronic device 410 and may perform authentication on the first electronic device 400 and/or second electronic device 410. The server 420 may receive the information shared between the first and second electronic devices 400 and 410 through the second communication channel 440 from at least one of the first and second electronic devices 400 and 410. The server 420 may be a subsystem equipped with an integrated processing function and may be implemented in the form of hardware, software, or firmware.

According to various embodiments, the first communication channel 430 is a bidirectional channel established via a base station and an operator network (circuit switched (CS) or packet switched (PS) network). The second communication channel 440 may be a channel established for data sharing between the first and second electronic devices 400 and 410, e.g. peer-to-peer (P2P) channel. According to various embodiments, the second communication channel 440 may be established via the server 420 and operator network or by means of a short range wireless communication protocol such as Wi-Fi.

The communication system configured as described above may make it possible for the first electronic device 400 to perform the first communication (e.g., voice call) with the second electronic device 410 through the first communication channel 430. During the bidirectional communication through the first communication channel 430, the first electronic device 400 may request to the server 420 for the second type communication (e.g., SWIS communication) and, in reply, the server 420 may establish the second communication channel (e.g. SWIS communication channel) 440 between the first and second electronic devices 400 and 410. According to various embodiments of the present disclosure, the first and second electronic devices 400 and 410 may share contents via the second communication channel 440, and the first electronic device 400 may generate feedback information based on the information received from the second electronic device 410. A description is made hereinafter of the communication system of FIG. 4 with reference to the accompanying drawings.

According to an embodiment of the present disclosure, the electronic device 101 includes a user interface, a communication circuit configured to connect the electronic device 101 to at least one external electronic device via at least one of the first and second communication channels 430 and 440, a memory 130, and a processor 120 that is electrically connected to the user interface, communication circuit, and memory 130; the memory 130 may store instructions executed by the processor 120 to establish a communication link with the external electronic device through the first and second communication channels 430 and 440, transmit contents to the external electronic device via the second communication channel 440, receive input information at the external electronic device in association with the contents and/or status information of the external electronic device via the second communication channel 440, generate feedback information related to the contents based on at least one of the input information and status information, and output the feedback information through the user interface. In this case, the user interface may include various components such as the display 160, the audio module 280, the vibration device, and LED device.

According to an embodiment of the present disclosure, the first communication channel 430 may be a channel for a CS or PS voice call over the operator network, and the second communication channel 440 may be a channel for data communication for sharing the contents with the external electronic device via the server 420.

According to an embodiment of the present disclosure, the instructions may be executed in such a way that the processor 120 controls the communication circuit to transmit a request for establishing the second communication channel 440 to the server 420 and make a communication connection with the external electronic device directly via the second communication channel 440 established by the server 420.

According to an embodiment of the present disclosure, the instructions may include that the processor 120, when activated, controls the communication circuit to transmit a request for establishing the second communication channel 440 to the server 420, checks whether an acknowledgement message transmitted by the external electronic device is received from the server 420 in a predetermined time period, and controls, when the acknowledgement message is not received in the predetermined time period, the communication circuit to release the first communication channel.

According to various embodiments of the present disclosure, the instructions may include that the processor 120, when activated, controls the communication circuit to check, when the acknowledgement message is received in the predetermined time period, whether a second communication channel establishment message is received from the server 420 in a predetermined time period and release, when the second communication channel establishment message is received in the predetermined period, the first communication channel.

According to an embodiment of the present disclosure, the electronic device 101 may further include a camera module 291, the contents may include a preview image output by the camera module 291, and the instructions may be executed in such a way that the processor 120 controls the camera module 291 to activate a camera function for the preview image based on the status information of the external electronic device and output the preview image generated by the camera function as feedback information.

According to an embodiment of the present disclosure, the input information includes the information input by the user of the external electronic device that is made at a predetermined area of the preview image, and the camera function may include at least one of a function for adjusting the focal point of the preview image for the predetermined area and a function of adjusting an out-focusing effect on the preview image.

According to an embodiment of the present disclosure, the instructions may be executed in such a way that the processor 120 controls, when it is detected that the screen displaying the contents from the external electronic device turns off or is switched to a screen which does not include the contents, the communication circuit to transmit to the external electronic device at least one of a control signal requesting output of the content on the external electronic device again and a control signal requesting display of an activation icon for displaying the contents on the external device.

According to an embodiment of the present disclosure, the instructions may be executed in such a way that the processor 120 controls, when information is received indicating that the first and second communication channels 430 and 440 cannot be established simultaneously, the communication circuit to release the first communication channel 430. In this case, the user interface may include an audio circuit, and the instructions may be executed in such a way that the processor 120 controls, when the first communication channel 430 is released, the communication circuit to transmit the voice signal collected at the electronic device 101 to the external electronic device via the second communication channel 440 and controls the audio circuit to output the voice signals received from the external electronic device via the second communication channel 440.

According to an embodiment of the present disclosure, the status information of the external electronic device may include at least one of information on whether the contents are displayed on the user interface of the external electronic device, information on whether the face of the external electronic device user contacts the external electronic device, and information of interactive user input made to the contents.

According to an embodiment of the present disclosure, the electronic device 101 may include a user interface for displaying at least one screen, a communication circuit for connecting the electronic device 101 to at least one external electronic device via at least one of the first and second communication channels 430 and 440, a memory 130, and a processor 120 that is electrically connected to the user interface, the communication circuit, and the memory 130. The memory 130 may include instructions which are executed in such a way that the processor 120 establishes a communication link with the external electronic device through the first and second communication channels 430 and 440, receives contents from the external electronic device via the second communication channel 440, displays the contents through the user interface, and transmits at least one of input information received from the electronic device 101 in association with the displayed contents and status information of the electronic device 101 to the external electronic device via the second communication channel 440.

According to an embodiment of the present disclosure, the instructions may be executed in such a way that the processor 120 controls the communication circuit to receive a request for establishing the second communication channel 440 from the external electronic device via the server and to make a communication connection with the external electronic device directly via the second communication channel 440 established by the server 420.

According to an embodiment of the present disclosure, the instructions may include that the processor, when activated, controls, when it is detected that the screen displaying the contents from the external electronic device turns off or is switched to a screen which does not include the contents, the communication circuit to transmit information indicating that the contents are not shared as the status information of the electronic device 101 to the external electronic device.

According to an embodiment of the present disclosure, the instructions may be executed in such a way that the processor 120 controls, when the screen with the contents is switched to a screen without the contents on the electronic device 101, the electronic device 101 to display an activation item for displaying the contents again on the switched screen and then to switch back to the screen with the contents in response to a user selection input made to the activation item.

According to an embodiment of the present disclosure, the instructions may be executed in such a way that the processor 120 determines whether the user's face contacts the electronic device 101 by means of the user interface or a sensor circuit and transmits, when the user's face contacts the electronic device 101, to the external electronic device the information indicating that the user's face contacts the electronic device 101 as status information of the electronic device 101.

According to an embodiment of the present disclosure, the contents may include a preview image output by the camera module 291, and the instructions may be executed in such a way that the processor 120 controls to transmit to the external electronic device an interactive user input made to the preview image as the status information of the electronic device 101.

According to an embodiment of the present disclosure, the instructions may be executed in such a way that the processor 120 controls the communication circuit to receive the contents taken by the camera module 291 and displayed on the external electronic device from the external electronic device based on the status information of the electronic device 101.

According to an embodiment of the present disclosure, the instructions may be executed in such a way that the processor 120 controls the communication circuit to receive information on the line of sight of the user of the electronic device 101 to at least part of the contents and transmits to the external electronic device the line-of-sight information as the status information of the electronic device 101.

According to an embodiment of the present disclosure, the electronic device 101 further includes an audio circuit, and the instructions are executed in such a way that the processor 120 controls, when the first communication channel 430 is released, the communication circuit to transmit the voice signal collected at the electronic device 101 to the external electronic device via the second communication channel 440 and controls the audio circuit to output the voice signals received from the external electronic device via the second communication channel 440.

According to an embodiment of the present disclosure, the electronic device (e.g., server 420) includes a communication circuit for establishing a communication channel (e.g., second communication channel 440) between electronic devices (e.g., the first and second electronic devices 400 and 410), a memory 130, and a processor 120 that is electrically connected to the communication circuit and the memory; the memory 130 storing instructions which are executed in such a way that the processor 120 receives a request for establishing the communication channel from a first external electronic device, forwards the request to a second external electronic device, and transmits an acknowledgement message received in response to the request to the first external electronic device to establish the communication channel.

According to an embodiment of the present disclosure, the instructions may be executed in such a way that the processor 120 performs authentication on at least one of the first and second external electronic devices in association with the communication channel.

Figure 5:
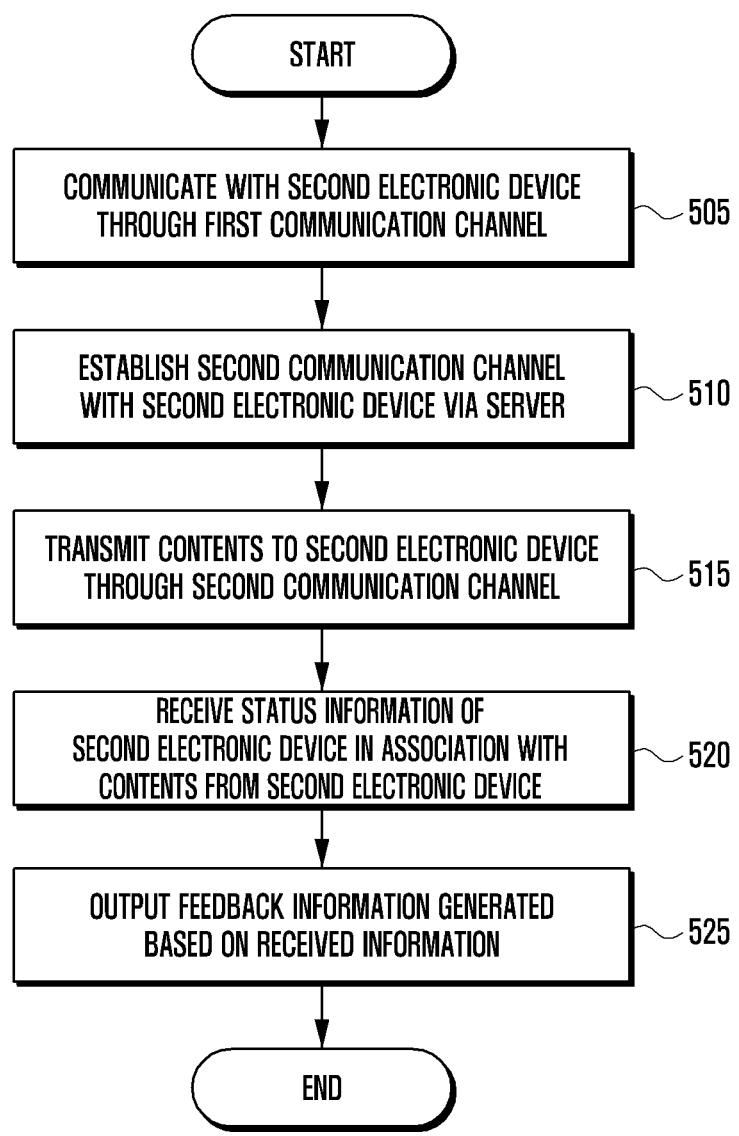
FIG. 5 is a flowchart illustrating an information exchange procedure between electronic devices via a communication channel according to various embodiments of the present disclosure.

FIG. 5 is a flowchart illustrating an information exchange procedure between electronic devices via a communication channel according to various embodiments of the present disclosure.

Referring to FIG. 5, the first electronic device 400 may correspond to the electronic device 101, and the second electronic device 410 may correspond to another electronic device. For explanatory convenience, it is assumed that a user (first user) of the first electronic device 400 is a calling party over the first and/or second communication channel, and a user (second user) of the second electronic device 410 is a called party over the first and/second communication channel.

According to an embodiment, the first electronic device 400 may communicate with the second electronic device 410 via the first electronic channel 430 at operation 505. The processor 120 of the first electronic device 400 may control a communication interface 170 or communication module 220 to establish a first communication connection with the second electronic device 410 via the first communication channel 430. For example, the user of the first electronic device 400 may place a voice call to the user of the second electronic device 410 via the first communication channel 430.

According to an embodiment, the first electronic device 400 may establish the second communication channel 440 with the second electronic device 410 via the server 420 at operation 510. The processor 120 of the first electronic device 400 may make a request for establishing the second communication channel 440 by transmitting a message requesting for the second communication connection to the server 420. By establishing the second communication channel 440 via the server 420, the first electronic device 400 may perform the second communication (e.g., SWIS communication) with the second electronic device 410 via the second communication channel 440 according to various embodiments of the present.

According to an embodiment, the first electronic device 400 may transmit contents to the second electronic device 410 via the second communication channel 440 at operation 515. The processor 120 of the first electronic device 400 may control the communication interface 170 or the communication module 220 to transmit the contents stored in the memory 130 or the contents displayed on the user interface (e.g., display 160) of the first electronic device 400 to the second electronic device 410. For example, the first electronic device 400 may transmit a photo to the second electronic device 410. In this case, the first and second electronic devices 400 and 410 may share the photo so as to display the photo in the same or similar manner.

According to an embodiment, at operation 520, the first electronic device 400 may receive the information input in association with the contents from the second electronic device 410 and/or the status information of the second electronic device 410. According to various embodiments, the processor 120 of the first electronic device 400 may receive the status information of the second electronic device 410 from the second electronic device 410 via the first communication channel 430 or the second communication channel 440 by means of the communication interface 160 or the communication module 220.

According to an embodiment, the status information of the second electronic device 410 may include the status information of the user interface (e.g. display 160) of the second electronic device 410 in association with the display of the contents. For example, the status information of the second electronic device 410 may include information indicating whether the contents shared with the first electronic device 400 are displayed on the user interface (e.g. display unit 160) of the second electronic device 410. In an embodiment, the processor 120 of the second electronic device 410 may transmit, when the screen displaying contents is replaced by or switched with another screen according to a push input made by the user of the second electronic device 410 to a home button in the state that the contents received from the first electronic device 400 are displayed on the user interface (e.g., display 160) of the second electronic device 410, to the first electronic device 400 the information indicating that the contents are not displayed currently as the status information of the second electronic device 410.

According to an embodiment, the status information of the second electronic device 410 may be the information acquired by means of the display 160 or the sensor module 240 of the second electronic device 410. For example, the second electronic device 410 may sense any contact of user's face (e.g. an ear) with the second electronic device 410 in the state that the contents are shared with the first electronic device 400 through the second communication (e.g., SWIS communication). In this case, the second electronic device 410 may determine that the user's face contacts the second electronic device 410 without looking at the screen showing the shared contents. The processor 120 of the second electronic device 410 may recognize the contact of the user's face with the second electronic device 410 based on the information such as a contact area range, a contact area pattern, and contact pressure or by means of a proximity sensor, and transmit to the first electronic device 400 the acquired information as the status information of the second electronic device 410.

According to an embodiment, the status information of the second electronic device 410 may include an interactive input made to the contents displayed by the second electronic device 410. According to various embodiments, the processor 120 of the second electronic device 410 may receive various touch inputs and interactive inputs made by the user onto the contents displayed on the user interface (e.g., display 160). The processor 120 of the second electronic device 410 may transmit to the first electronic device 400 an input signal generated by a touch input or an interactive input as the status information of the contents. For example, if an interactive input such as a touch gesture and a drag and drop gesture made by the user to a photo displayed on the second electronic device 410 is detected, the second electronic device 410 may transmit the corresponding input signal to the first electronic device 400.

According to an embodiment, the user's interactive input to the contents may be the information on the second user's line-of-sight to the contents. According to various embodiments, the line-of-sight may be detected by a hardware module such as the processor 120 or an application module 310. The second electronic device 410 may acquire the information on the line-of-sight of the second user to the contents displayed on the second electronic device 410 by means of its processor 120 or application module 310. For example, the processor 120 of the second electronic device 410 may detect the position of the pupil of the user and generate the line-of-signal information based on the detected position of the pupil.

The light-of-sight information may be acquired by various algorithms. For example, the second electronic device 410 may collect the line-of-sight information of the second user with an optical method or an electric field/magnetic field change-based method. The processor 120 of the second electronic device 410 may collect the line-of-sight information by controlling various components such as the camera module 291.

In an embodiment of the optical method, the second electronic device 410 may collect the line-of-sight information using a Dual Purkinje System which detects the light reflected on the front and rear surfaces of the cornea of the user and calculates the orientation of the reflected light to determine the line of sight. In another embodiment of the optical method, the second electronic device 410 may collect the line-of-sight information using a Bright Pupil System which illuminates the eyes of the user with an infrared beam that traces the light reflecting on the cornea. In still another optical method, the second electronic device 410 may collect the line-of-sight information using a Dark Pupil System which illuminates the eyes of the user with an infrared beam at a predetermined angle and analyzes the contrast information of the pupil of the second user.

In an embodiment of the electric field/magnetic field change-based method, the second electronic device 410 may collect the line-of-signal information of the second user using electrical oculography (EOG) for tracking change in the electric field according to the polarity difference between the user's eyes. In another embodiment of the electric field/magnetic field change-based method, the second electronic device 410 may collect the line-of-sight information of the second user using the Coil System for tracking change in the magnetic field of a magnetic coil placed around the second user's eyes.

According to various embodiments, the second electronic device 410 may collect the information on the second user's light-of-sight to the contents based on the aforementioned methods. The processor 120 of the second electronic device 410 may detect the line of sight of the second user to a certain area or a certain object of the contents. The area range for detecting the line of sight of the user may be determined differently depending on the light-of-sight recognition method.

According to an embodiment, the first electronic device 400 may generate feedback information based on the received information and output the generated feedback information at operation 525. The processor 120 of the first electronic device may generate the feedback information based on the status information received from the second electronic device 410 (e.g. status information of the second electronic device which is related to the contents). The feedback information may include how the second electronic device 410 or the user of the second electronic device 410 reacts to the contents transmitted by the first electronic device 400. According to various embodiments, the feedback information may be generated in the form of a UI menu or a UI item. The first electronic device 400 may notify the first user of the status of the second electronic device 140 by outputting the feedback information through a user interface such as the display 160 or the audio module 280.

Figure 6:
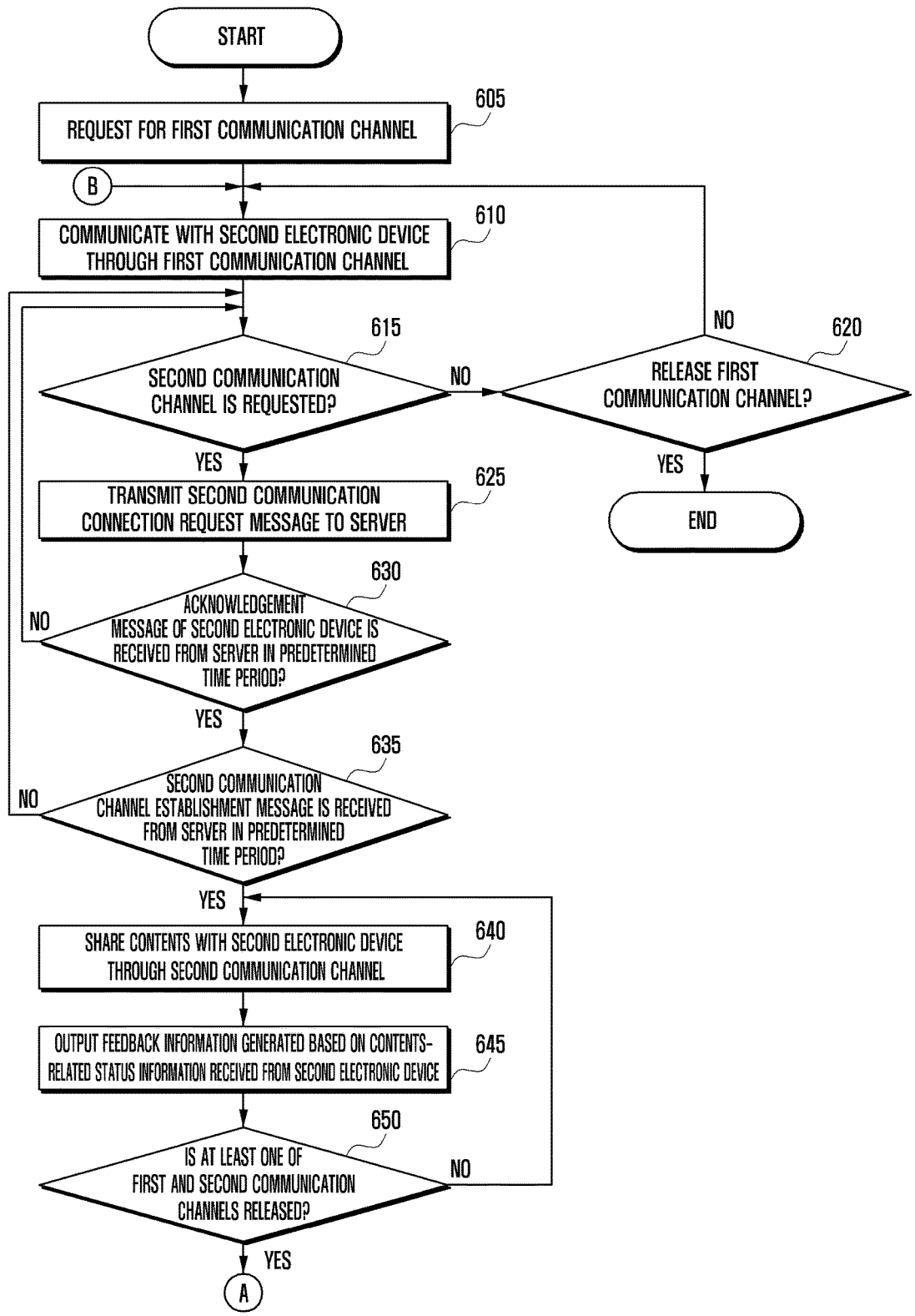
FIGS. 6 and 7 are flowcharts illustrating a communication connection establishment procedure between two electronic devices with the assistance of a server according to various embodiments of the present disclosure.
Figure 7:
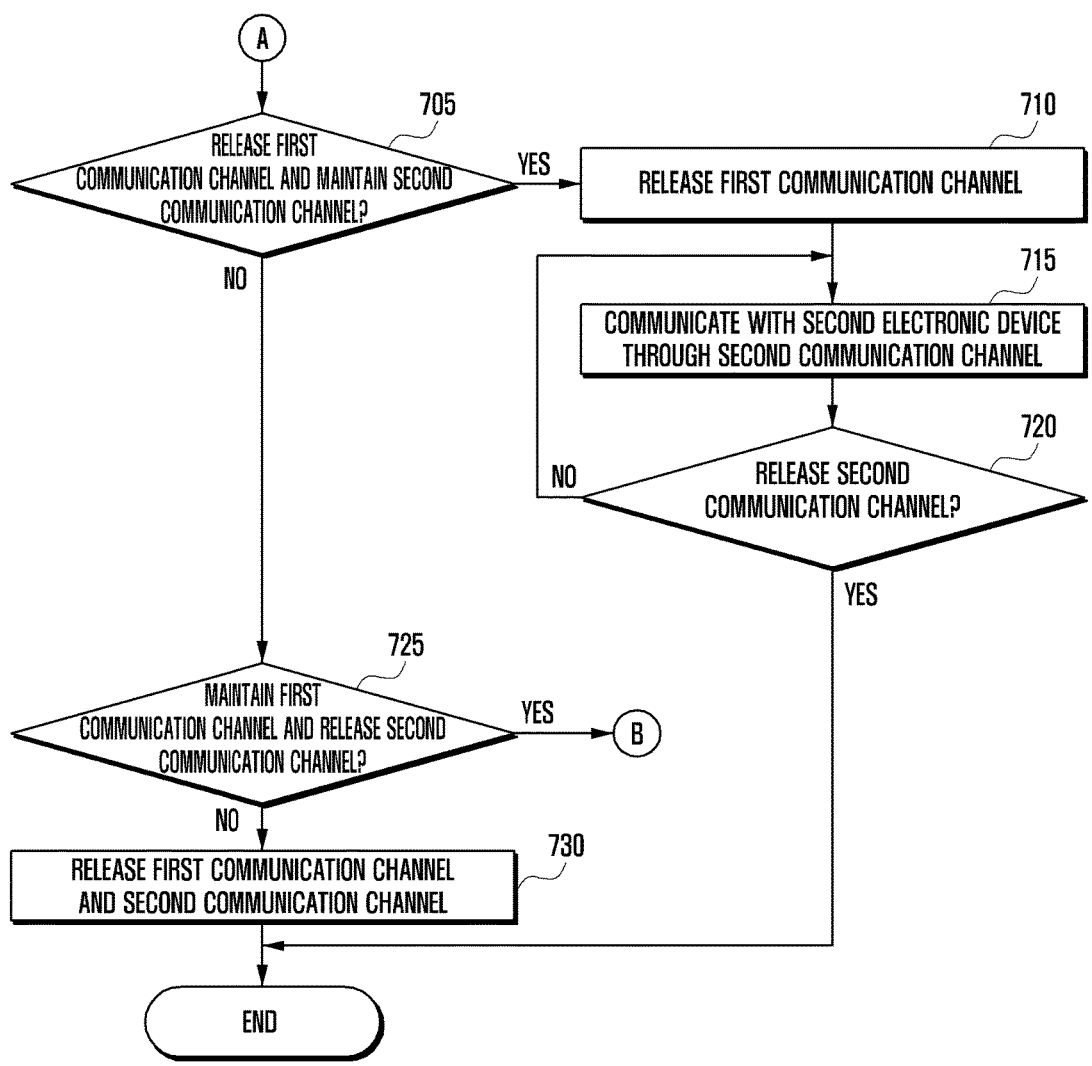

FIGS. 6 and 7 are flowcharts illustrating a communication connection establishment procedure between two electronic devices with the assistance of a server according to various embodiments of the present disclosure.

Referring to FIGS. 6 and 7, the first electronic device 400 may correspond to the electronic device 101, and the second electronic device 410 may correspond to another electronic device. For explanatory convenience, it is assumed that the user of the first electronic device 400 is a calling party over the first and second communication channels, and the user of the second electronic device 410 (second user) is a called party over the first and second communication channels.

According to an embodiment, the first electronic device 400 may make a request for the first communication connection with the second electronic device 410 at operation 605. If the first communication request is received through the input/output interface 150 or the display unit 160, the processor 120 of the first electronic device 400 may control the communication interface 170 or the communication module 220 to make a request for the first communication connection with the second electronic device 410 to the base station. For example, the first electronic device 400 may make a request for voice communication connection with the second electronic device 410 to the base station upon receipt of the input made by means of a dial or a communication connection button of the second electronic device 410.

According to an embodiment, the first electronic device 400 may communicate with the second electronic device 410 via the first communication channel 430 at operation 610. For example, the first user may start a voice call with the second user via the first communication channel 430.

According to an embodiment, the first electronic device 400 may determine whether a second communication request is received at operation 615. The processor 120 of the first electronic device 400 may receive a second communication (e.g., SWIS communication) connection request input made by the first user through the input/output interface 150 or the display 160. For example, if the first user makes a click on a second communication-related application (e.g., SWIS application) icon displayed on the display 160, the processor 120 or the application module 310 of the first electronic device 400 may execute the second communication related application (e.g., SWIS application).

According to an embodiment, if the second communication connection request is received, the first electronic device 400 may send the server 420 a second communication connection request message at operation 625. According to another embodiment, if the second communication connection request is not received, the first electronic device 400 may determine whether to release the first communication connection at operation 620. If it is determined to release the first communication connection according to the user input or the operation policy of the first electronic device 400, the first electronic device 400 may end the procedure of FIG. 6. Otherwise, if it is determined not to release the first communication connection, the procedure returns to operation 610 for the first electronic device 400 to continue communication with the second electronic device through the first communication channel 430.

According to an embodiment, the first electronic device 400 may determine whether an acknowledgement message transmitted by the second electronic device 410 is received from the server 420 in a predetermined time period at operation 630. The acknowledgement message transmitted by the second electronic device 410 may be a message indicating that the second electronic device 410 which has received the connection request message from the first electronic device 400 has a capability of the second communication (e.g., SWIS communication). In the case that the second electronic device 410 includes a SWIS module or a second communication-related application (e.g., SWIS application) or the processor 120 of the second electronic device 410 is configured to support the second communication (e.g., SWIS communication) function, the processor 120 of the second electronic device 410 may send the server 420 the acknowledgement message by means of the communication interface 170 or the communication module 220. The acknowledgement message transmitted by the second electronic device 410 may be a message indicating that the second electronic device 410 supports the second type communication (e.g., SWIS communication). Although the second electronic device 410 has the second communication (e.g., SWIS communication) module, if the network of the second electronic device 410 is unstable or erroneous, the processor 120 of the second electronic device 410 may not transmit the acknowledgement message.

According to various embodiments, the server 420 may forward the acknowledgement message received from the second electronic device 410 to the first electronic device 400 and perform authentication on the first and second electronic devices 400 and 410 simultaneously or sequentially. For example, the server may determine whether the first and second electronic devices 400 and 410 are registered with the server 420 for the second communication (e.g., SWIS communication). According to various embodiments, the server 420 may determine whether the first and second electronic devices 400 and 410 are registered with the server 420 based on the identity information received therefrom. The identity information may be phone number or unique device information of the first and second electronic devices 400 and 410.

According to various embodiments, if the SWIS module has been installed previously in the first and second electronic devices 400 and 410, the authentication operation may be performed in such a way that the users of the first and second electronic devices 400 and 410 exchange the authentication information with the server 420 or register the authentication information with the server 420. However, the present disclosure is not limited to the above described process and, according to various embodiments, the first and second electronic devices 400 and 410 and the server 420 may store the same authentication key algorithm or mutual authentication key algorithm capable of mutual encryption and decryption. The first and second electronic devices 400 and 410 may authenticate each other by exchanging the supportable algorithm with the server 420 or through a message authentication scheme for exchanging an encryption key.

According to various embodiments, at least one of the first and second electronic devices 400 and 410 may perform a second communication (e.g., SWIS communication) service subscription check operation during the first communication (e.g. voice call). At least one of the first and second electronic devices 400 and 410 may perform the second communication-related service subscription check operation via the server 420.

According to an embodiment, if it fails to receive the acknowledgement message transmitted by the second electronic device 410 from the server 420 in the predetermined period, the procedure returns to operation 615 at which the first electronic device 400 determines whether a second communication connection request message is received. In this way, the user of the first electronic device 400 may check the data communication failure situation during the bidirectional communication such as voice call.

According to an embodiment, if the acknowledgement message transmitted by the second electronic device 410 is received from the server 420 in the predetermined time, the first electronic device 400 may determine whether a second communication channel establishment message is received from the server in a predetermined period at operation 635. The second communication channel establishment message may be a message indicating that the server 420 has established the second communication channel 440 according to the second connection request signal received from at least one of the first and second electronic devices 400 and 410. The server 420 may send the first and second electronic devices 400 and 410 the second communication channel establishment message when the second communication channel 440 is established.

According to an embodiment, if the second communication channel establishment message is not received in the predetermined period, the procedure returns to operation 615 at which the first electronic device 400 determines whether the second communication connection is requested. In this way, the user of the first electronic device 400 may check that the data communication is available but bad in quality and thus regard this situation as SWIS connection failure situation. According to an embodiment, if the second communication channel establishment message is received in the predetermined period, the first electronic device 400 may share the contents with the second electronic device 410 via the second communication channel 440 at operation 640. For example, if the second communication connection is established, the processor 120 of the first electronic device 400 may control the communication interface 170 or the communication module 220 to transmit the content selected in response to a user's request to the second electronic device 410 via the second communication channel 440.

According to an embodiment, it may be possible to omit terminating the communication when the second communication channel establishment message is not received in the predetermined period. According to an embodiment, the first electronic device 400 may receive the contents-related status information from the second electronic device 410 via the second communication channel 440 and generate feedback information based on the contents-related status information at operation 645.

According to various embodiments, operations 640 and 645 may correspond to operations 515 to 525 of FIG. 5.

According to an embodiment, the first electronic device 400 may determine whether to release at least one of the first and second communication channels 430 and 440 at operation 650. If it is determined to release both the communication channels 430 and 440, the procedure returns to operation 640 at which the first electronic device 400 may share the contents with the second electronic device via the second communication channel 440. In this case, the first communication channel may be maintained too.

If it is determined that at least one of the first and second communication channels 430 and 440 is released, the first electronic device 410 may perform an operation depending on the situation in the subsequent procedure of FIG. 7.

According to an embodiment, if the first communication channel 430 is released while the second communication channel 440 is maintained at operation 705, the procedure goes to operation 710 at which the first electronic device 400 may release the first communication channel 430. The first electronic device 400 may communicate with the second electronic device 410 via the second communication channel 440 at operation 715. If the second communication channel 440 is released at operation 720, the first electronic device 400 may terminate the procedure of FIG. 7. If the second communication channel is not released at operation 720, the procedure returns to operation 715 to continue communication with the second electronic device via the second communication channel 440.

According to an embodiment, if it is determined to maintain the first communication channel 430 and release the second communication channel at operation 725, the procedure returns to operation 610 of FIG. 6 to communicate with the second electronic device 410 via the first communication channel 430.

According to an embodiment, if it is determined to release both the first and second communication channels 430 and 440 at operation 725, the first electronic device 410 may release both the first and second communication channels 430 and 440 and end the procedure of FIG. 7 at operation 730.

Figure 8:
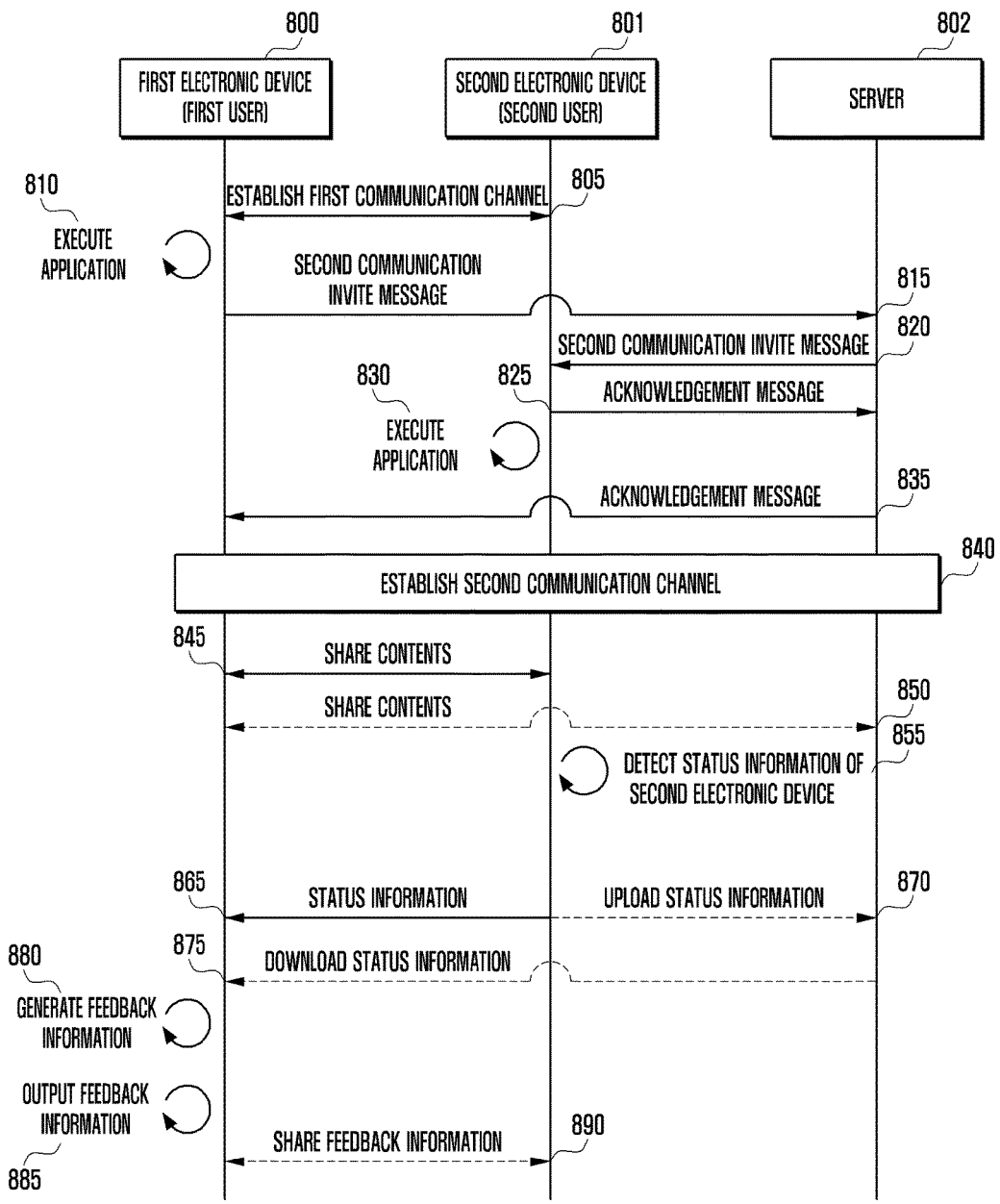
FIG. 8 is a signal flow diagram illustrating signal flows among two electronic devices and a server in an information sharing procedure according to various embodiments of the present disclosure.

FIG. 8 is a signal flow diagram illustrating signal flows among two electronic devices and a server in an information sharing procedure according to various embodiments of the present disclosure.

Referring to FIG. 8, the first and second electronic devices 800 and 801 and the server 802 may correspond to the first and second electronic devices 400 and 410 and the server 420, respectively. In FIG. 8, the second communication connection may denote the second communication connection via the second communication channel 440 of FIG. 4. The second communication connection may be the connection for SWIS communication.

According to an embodiment, the first and second electronic devices 800 and 801 may establish the first communication channel at operation 805. For example, the first and second users may be on a voice call session.

According to an embodiment, the first electronic device 800 may execute a second communication-related application (e.g., SWIS application) in response to a user request at operation 810. According to various embodiments, the processor 120 of the first electronic device 800 may display an icon representing the second communication-related application (e.g., SWIS application) on a user interface such as the display 160 and detect a user's input gesture (e.g., touch gesture) for selecting the icon. The processor 120 of the first electronic device 800 may execute the second communication-related application (e.g., SWIS application) in response to the input signal corresponding to the user's input gesture for selecting the icon. In this way, the first electronic device 800 may allocate resources for use in executing the SWIS communication and GUI resources to the second communication-related application (e.g., SWIS application) and control the communication interface 170 or the communication module 220 to support the functions related to the data communication.

According to an embodiment, the first electronic device 800 may send the server 802 a second communication (e.g., SWIS communication) invite message for establishing a link for the second communication (e.g., SWIS communication) with the second electronic device 801 at operation 815. For example, the processor 120 of the first electronic device 800 may control the communication interface 170 or the communication module 220 to transmit the second communication (e.g., SWIS communication) invite message to the server 802. The second communication (e.g., SWIS communication) invite message may correspond to the second communication connection request message described with reference to operation 625 of FIG. 6.

Although not shown in the drawing, if the second communication (e.g., SWIS communication) invite message is received from the first electronic device 800, the server 802 may perform authentication on the first electronic device 800 in association with the second communication (e.g., SWIS communication). According to various embodiments, the server 802 may determine whether the first electronic device 800 is registered with the server 802 or authenticated for the second communication (e.g., SWIS communication). According to various embodiments, the authentication operation on the first electronic device 800 may be performed at a certain time point between operations 805 and 840. If the authentication on the first electronic device 800 is completed, the server 802 may forward the second communication (e.g., SWIs communication) invite message transmitted by the first electronic device 800 to the second electronic device.

According to various embodiments, if the first electronic device 800 is neither registered with the server 802 nor authenticated in association with the second communication (e.g., SWIS communication), it may not transmit the second communication (e.g., SWIS communication) invite message to the second electronic device 801. In this case, the server 802 may guide the first electronic device 800 for a new authentication process. For example, the server 802 may request for authentication information or device registration for the second communication (e.g., SWIS communication).

According to an embodiment, the server 802 may forward the second communication (e.g., SWIS communication) invite message received from the first electronic device 800 to the second electronic device 801 at operation 820. According to various embodiments, the processor 120 of the second electronic device 801 may control the communication interface 170 or the communication module 220 to receive the second communication (e.g., SWIS communication) invite message from the server 802.

According to an embodiment, the second electronic device 801 may transmit an acknowledgement message to the server 802 at operation 825. According to various embodiments, the processor 120 of the second electronic device 801 may determine whether the second electronic device 801 has a capability for supporting the second communication (e.g., SWIS communication) upon receipt of the second communication (e.g., SWIS communication) invite message. For example, the processor 120 of the second electronic device 801 may determine whether the second electronic device 801 is capable of performing the second communication (e.g., SWIS communication) based on at least one of installation of the application supporting the second communication (e.g., SWIS communication) function, existence of a related hardware component, and network condition. If it is determined that the second electronic device has the capability of the second communication (e.g., SWIS communication), the processor 120 of the second electronic device 801 may transmit the acknowledgement message to the server 802.

Although not shown in the drawing, the server 802 may determine whether the second electronic device 801 is an authenticated device. For example, the server 802 may compare the device information of the second electronic device 801 with previously stored authenticated device information to determine whether the second electronic device 801 is capable of the second communication (e.g., SWIS communication). Furthermore, the server 802 may perform authentication on the second electronic device 801 in association with the second communication (e.g., SWIS communication) using various authentication algorithms. According to various embodiments, the authentication operation of the second electronic device 801 may be performed at any time point between operations 805 and 840.

According to an embodiment, the second electronic device 801 may execute a second communication-related application (e.g., SWIS application) at operation 830. In this way, the second electronic device 801 may allocate resources for use in executing the SWIS communication and GUI resources to the second communication-related application (e.g., SWIS application) and control the communication interface 170 or the communication module 220 to support the functions related to the data communication.

Although it is depicted that operations 825 and 830 are performed in sequential order in FIG. 8, the present disclosure is not limited thereto. For example, the second electronic device 801 may execute the second communication-related application (e.g., SWIS application) upon receipt of the second communication (e.g., SWIS communication) invite message and transmit the acknowledgement message to the server simultaneously or sequentially.

According to an embodiment, the server 802 may forward the acknowledgement message received from the second electronic device 801 to the first electronic device 800 at operation 835.

According to an embodiment, the server 802 may establish the second communication (e.g., SWIS communication) channel at operation 840 such that the first and second electronic devices 800 and 801 communicate data through the second communication (e.g., SWIS communication) channel. According to various embodiments, the second communication (e.g., SWIS communication) channel may be a communication channel supporting P2P communication.

According to an embodiment the first and second electronic devices 800 and 801 may share contents through the second communication (e.g., SWIS communication) channel at operation 845. According to various embodiments, the contents may include all the types of objects that can be displayed on the user interfaces (e.g., display 160) of the first and second electronic devices 800 and 801. For example, the contents may include various objects that can be displayed by the first and second electronic devices 800 and 801 such as a home screen, an application execution screen, a menu, an icon, a video, a still image, a motion image, and a thumbnail image. The contents may also be configured in the form of a combination of at least one of letters, numbers, images, and UI items.

According to various embodiments, the first electronic device 800 may share the contents with the server 802 at operation 850. For example, the first electronic device 800 may upload the contents to the server 802. Although not shown in the drawing, the second electronic device 801 may receive the shared contents from the server. For example, the processor 120 of the second electronic device 801 may download the contents stored in the server 802.

According to an embodiment, the processor 120 of the second electronic device 802 may check its status at operation 855. Various embodiments related to operation 855 are described later with reference to accompanying drawings.

According to an embodiment, the second electronic device 801 may transmit the detected status information to the first electronic device 800 at operation 865. For example, the processor 120 of the second electronic device 801 may control the communication interface 170 or the communication module 220 to transmit its status information to the first electronic device 800.

According to an embodiment, the second electronic device 801 may upload the detected status information to the server 802 at operation 870. For example, the processor 120 of the second electronic device 801 may control the communication interface 170 or the communication module 220 to transmit the status information of the second electronic device 801 to the server 802.

According to an embodiment, the first electronic device 800 may download the status information which the second electronic device 802 has uploaded to the server 802 at operation 875. For example, the processor 120 of the first electronic device 800 may control the communication interface 170 or the communication module 220 to receive the status information stored in the server 802.

According to an embodiment, the first electronic device 800 may generate feedback information at operation 880. According to various embodiments, the processor 120 of the first electronic device 800 may generate the feedback information based on the status information of the second electronic device 801.

According to an embodiment, the first electronic device 800 may output the feedback information at operation 885. According to various embodiments, the processor 120 of the first electronic device 800 may control output devices (user interfaces) including the display 160 and the audio module 280 to output the feedback information.

According to an embodiment, the first and second electronic devices 800 and 801 may share the feedback information at operation 890.

Figure 9:
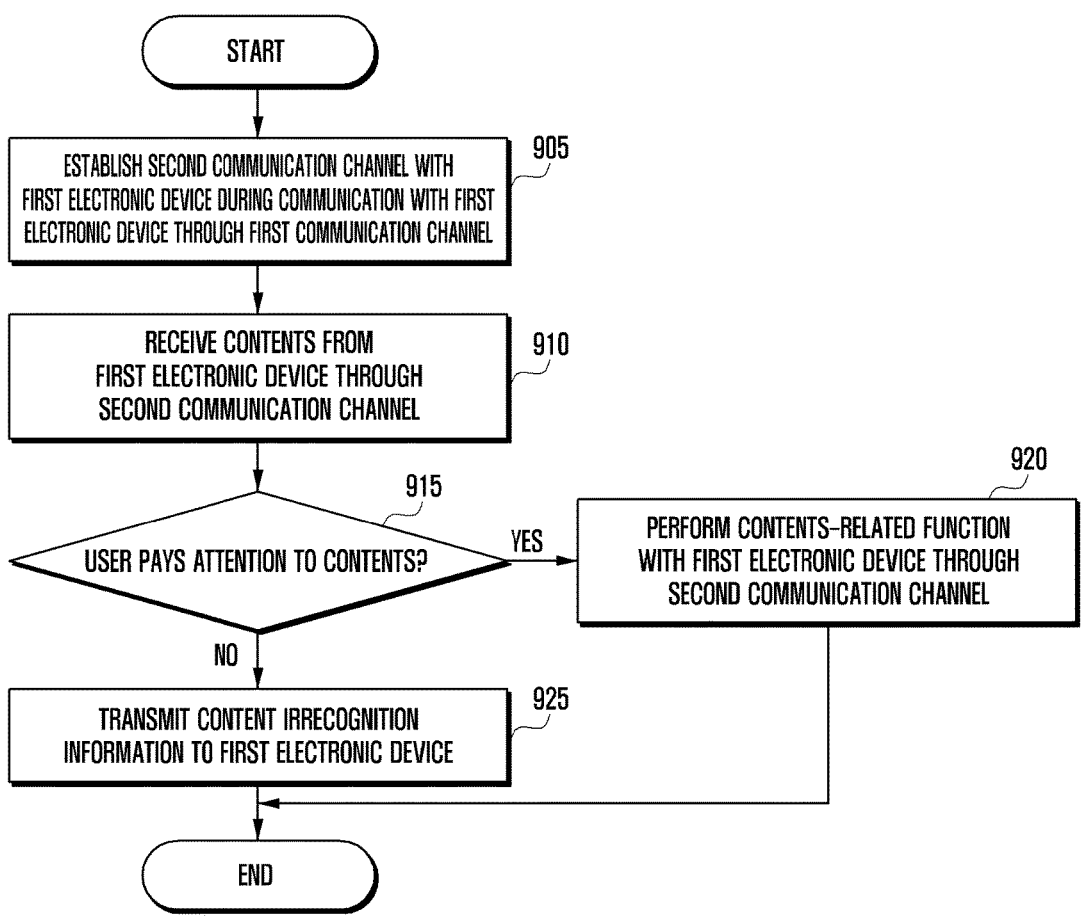
FIG. 9 is a flowchart illustrating a procedure for a second electronic device to transmit to a first electronic device the information on whether the user of the second electronic device has recognized the contents received from the first electronic device according to various embodiments of the present disclosure.

FIG. 9 is a flowchart illustrating a procedure for a second electronic device to transmit to a first electronic device the information on whether the user of the second electronic device has recognized the contents received from the first electronic device according to various embodiments of the present disclosure.

Referring to FIG. 9, the second electronic device 410 may establish the second communication channel with the first electronic device during the first communication with the first electronic device 400 at operation 905. For example, the second electronic device 410 may receive a second communication (e.g., SWIS communication) connection request from the first electronic device 400 during a voice call with the first electronic device and establish the second communication (e.g., SWIS communication) connection with the first electronic device via the server 420.

According to an embodiment, the second electronic device 410 may receive contents from the first electronic device 400 through the second communication channel 440 at operation 910. The second electronic device 410 may output the contents received from the first electronic device 400 through various interfaces, e.g. display 160.

According to an embodiment, the second electronic device 410 may determine whether the second user pays attention to the contents at operation 915. For example, the processor 120 of the second electronic device 410 may receive a second user's interactive input made to the contents. For example, the second electronic device 410 may detect the line-of-sight of the second user to determine whether the user is paying attention to the contents using the various line-of-sight recognition algorithms as described above.

According to an embodiment, if it is determined that the second user does not pay attention to the contents, the second electronic device 410 may transmit contents irrecognition information to the first electronic device 410 at operation 925. The contents irrecognition information may be the information indicating that the user's line of sight is not oriented to the contents.

According to an embodiment of the present disclosure, if it is determined that the second user is paying attention to the contents, the second electronic device 410 may perform a function related to the contents with the first electronic device 410 through the second communication channel at operation 920.

Figure 10A:
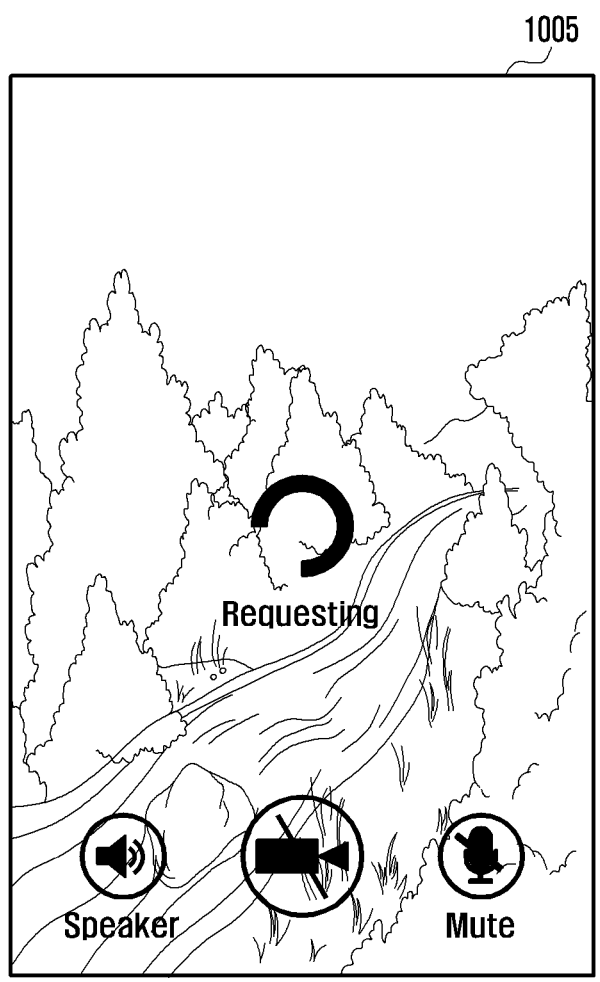
FIGS. 10A and 10B are screen images for explaining an operation of a first electronic device to receive status information of a second electronic device and display feedback information according to various embodiments of the present disclosure.
Figure 10B:
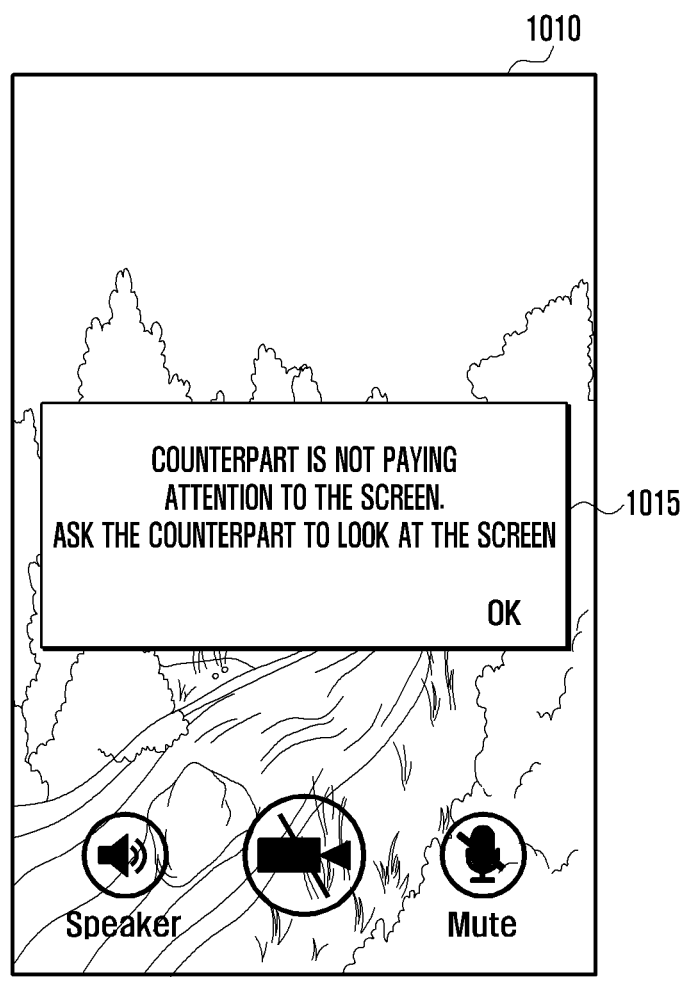

FIGS. 10A and 10B are screen images for explaining an operation of a first electronic device to receive status information of the second electronic device 410 and display feedback information. The following description is made under the assumption that the first and second electronic devices 400 and 410 are communicating with each other through a second communication (e.g., SWIS communication) link in FIGS. 10A and 10B.

Referring to FIG. 10A, the processor 120 of the first electronic device 400 may request for transmitting the contents displayed on the user interface (e.g., display 160) of the first electronic device 400 through the second communication (e.g., SWIS communication) channel upon receipt of a user request. As shown in the drawing, the first electronic device 400 may display a second communication (e.g., SWIS communication) connection request screen and, if the second communication (e.g., SWIS communication) connection is established, request for transmitting the screen 1005 displayed on the user interface (e.g., display 160) of the first electronic device 400 through the second communication (e.g., SWIS communication) channel. Although not shown in the drawing, the second electronic device 410 may establish the second communication (e.g., SWIS communication) channel with the first electronic device 400 and display the screen which the first electronic device 400 has transmitted through the SWIS channel in response to a second user's input for accepting the request.

Referring to FIG. 10B, the first electronic device 400 may receive the status information indicating that the user of the second electronic device 410 (second user) is not paying attention to the contents 1005 and output feedback information generated based on the status information in the form of a message window 1015. For example, the second electronic device 410 may detect the line of sight of the second user. If it is determined that the second user is not paying attention to the contents based on the line-of-sight information, the second electronic device 410 may generate the status information indicating that the second user is not paying attention to the contents and transmit the status information to the first electronic device 400. The first electronic device 400 may generate the feedback information indicating that the second user is not paying attention to the contents as a UI item 1015 based on the status information received from the second electronic device 410 and display the UI item 1015 on the screen 1010. In this case, the first user may talk to the second user to look at the currently shared contents through the first communication connection (e.g., voice call).

According to various embodiments, the first electronic device 400 may output the feedback information by means of the sensor module 240 or the motor 298. For example, the first electronic device 400 may present the feedback information in the form of vibration by means of the sensor module 240 or motor 298 or another electronic device (e.g., wearable device) connected to the first electronic device 400.

Figure 11A:
FIGS. 11A and 11B are screen images for explaining an operation of a first electronic device for displaying feedback information generated based on status information of a second electronic device according to various embodiments of the present disclosure.
Figure 11B:
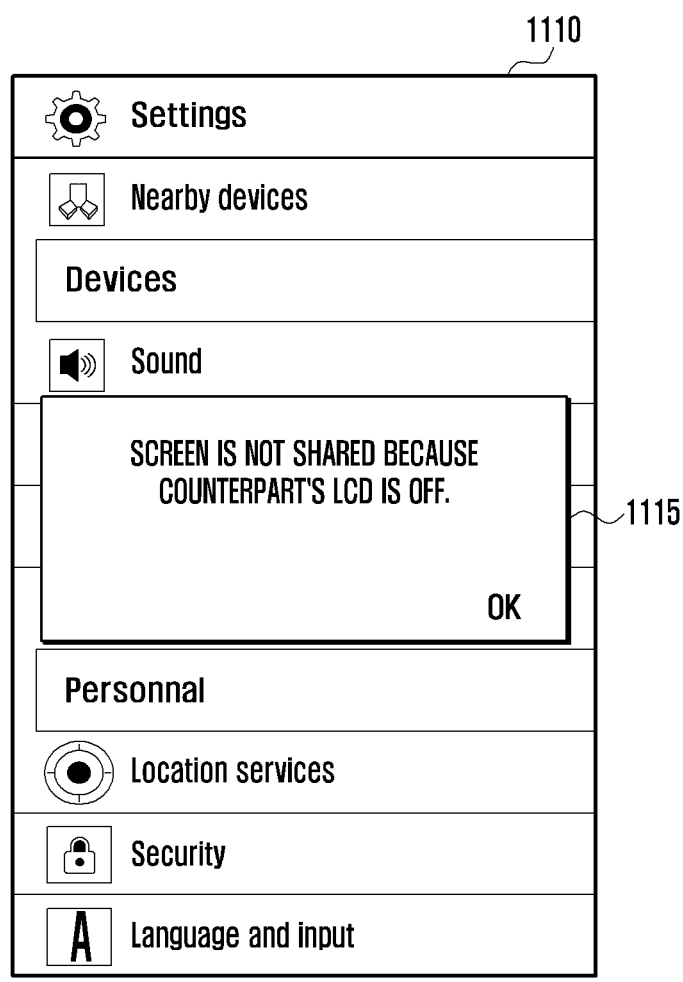

FIGS. 11A and 11B are screen images for explaining an operation of a first electronic device for displaying feedback information generated based on status information of a second electronic device according to various embodiments of the present disclosure. The following description is made under the assumption that the first and second electronic devices 400 and 410 are communicating with each other through the second communication (e.g., SWIS communication) link in FIGS. 11A and 11B.

Referring to FIGS. 11A and 11B, the first electronic device 400 may transmit the screen 1105 to the second electronic device 410 through the second communication channel 440. The second electronic device 410 may receive a user input for turning off the screen displayed on its own user interface (e.g., display 160) for displaying the screen 1105 received from the first electronic device 400. For example, the user of the second electronic device 410 may deactivate the user interface (e.g., display 160) by means of an external key. In this case, the processor 120 of the second electronic device 410 may generate its status information in association with the contents based on the situation where the user interface (e.g., display 160) is turned off so as not to display the contents any more. The second electronic device 410 may transmit its status information to the first electronic device 400. The first electronic device 400 may generate feedback information in the form of a UI window 1115 based on the status information received from the second electronic device 410 and output the generated feedback information on screen 1110.

FIG. 12 is a signal flow diagram illustrating a procedure of sharing a camera's preview image taken by a first electronic device with a second electronic device according to various embodiments of the present disclosure.

Referring to FIG. 12, the first and second electronic devices 1200 and 1201 may communicate with each other through the first communication connection (e.g., voice call connection). The first and second electronic devices 1200 and 1201 and the server 1202 of FIG. 12 may correspond to the first and second electronic devices 400 and 410 and the server 420 of FIG. 4, respectively.

According to an embodiment, the first and second electronic devices 1200 and 1201 may establish the second communication (e.g., SWIS communication) with the assistance of the server 1202 at operation 1205.

According to an embodiment, the first electronic device 1200 may activate a camera at operation 1210. According to various embodiments, the processor 120 of the first electronic device 1200 may activate the camera module 291 to take a preview image. According to various embodiments, the camera may be embedded in the first electronic device 1200 but it is not limited thereto. For example, the camera may be an independent module separated physically from the first electronic device 1200.

According to an embodiment, the electronic devices 1200 and 1201 may share the preview image taken by the camera at operation 1215. For example, the processor 120 of the first electronic device 1200 may transmit the preview image displayed on the user interface (e.g., display 160) to the second electronic device 1201 via the second communication (e.g., SWIS communication) channel, the processor 120 of the second electronic device 1201 may control the user interface (e.g., display 160) of the second electronic device 1201 to display the preview image received from the first electronic device 1200.

According to an embodiment, the second electronic device 1201 may receive a user input made to a predetermined area of the preview image at operation 1220. For example, the processor 120 of the second electronic device 1201 may detect a user's gesture (e.g., touch gesture) made to the preview image displayed on the user interface (e.g., display 160) and detect the input signal corresponding to the user's gesture made to a predetermined area of the preview image.

According to an embodiment, the second electronic device 1201 may transmit to the first electronic device 1200 the information on the area to which the user's gesture has been made at operation 1225. For example, the processor 120 of the second electronic device 1201 may control the communication interface 170 or the communication module 220 to transmit to the first electronic device 1200 the signal generated in correspondence to the user's gesture made to the predetermined area of the preview image.

According to an embodiment, the first electronic device 1200 may execute a camera function based on the information on the predetermined area which is received from the second electronic device 1201 at operation 1230. According to various embodiments, the processor 120 of the first electronic device 1200 may configure a focal point of the camera to the predetermined area of the preview image based on the information received from the second electronic device 1201. In this case, the user of the second electronic device 1201 may control the first electronic device 1200, the camera of the first electronic device 1200, or the camera module to focus at the predetermined area of the preview image.

According to an embodiment, the first and second electronic devices 1200 and 1201 may share the information on the camera function execution result of operation 1230 at operation 1235. For example, the first electronic device 1200 may transmit to the second electronic device 1201 the information on the change of the preview image which is caused by the change of the focal point, and the second electronic device 1201 may display the preview image with changed focal point.

Figure 13A:
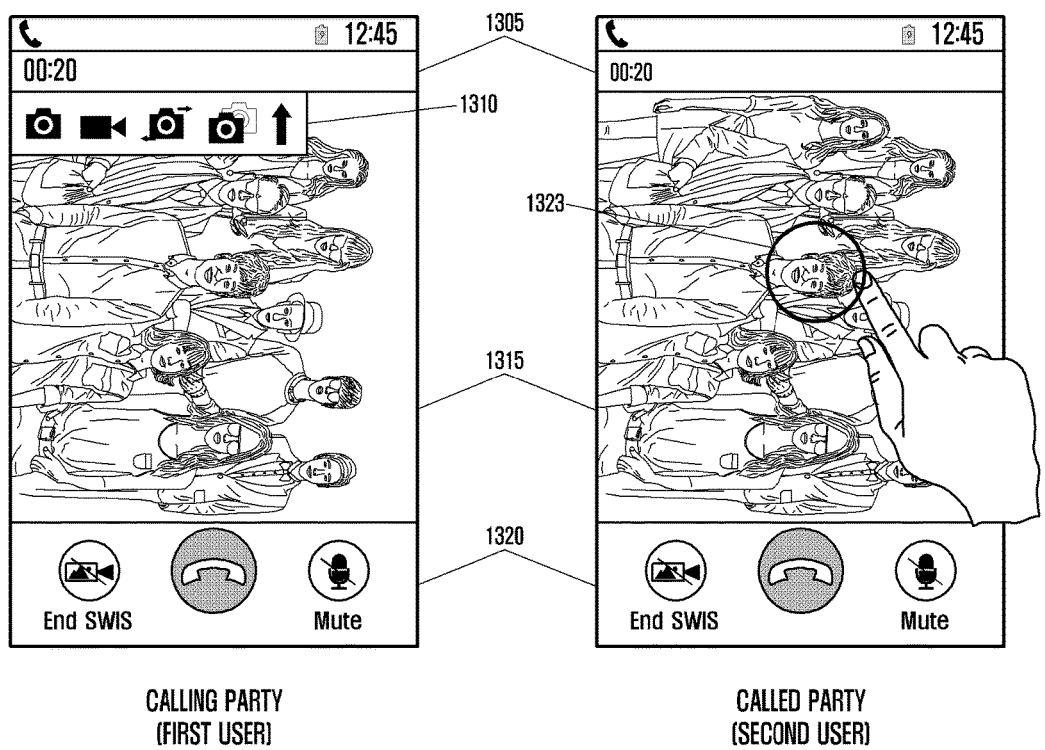
FIGS. 13A and 13B are diagrams illustrating screen images for explaining an operation of exchanging information related to a preview image between a first and a second electronic device through a second communication according to an embodiment of the present disclosure
Figure 13B:
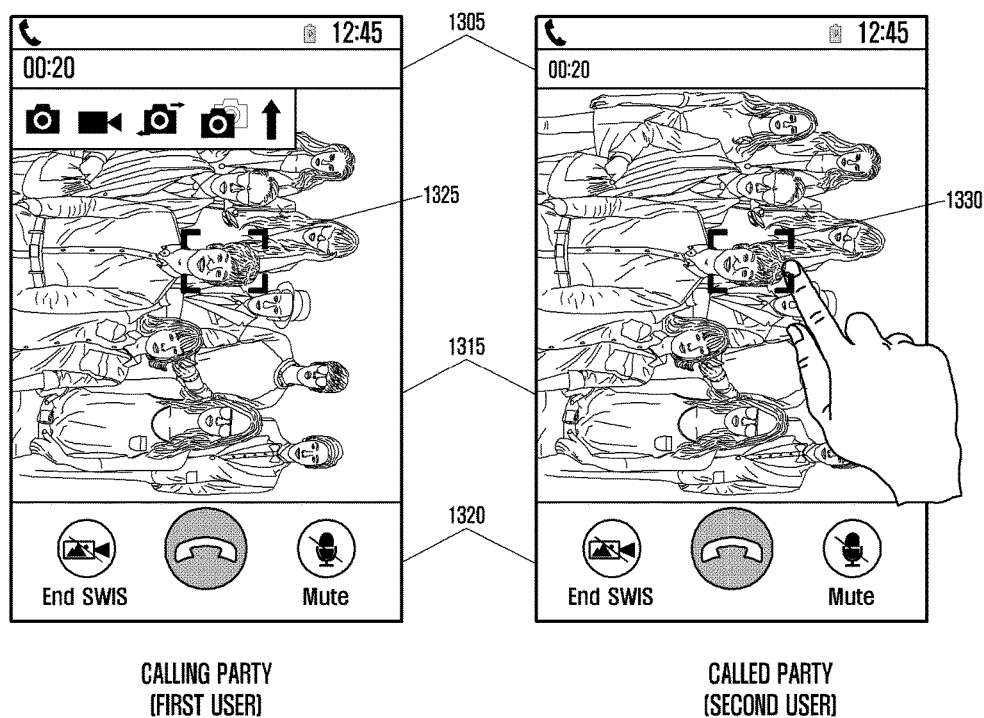

FIGS. 13A and 13B are diagrams illustrating screen images for explaining an operation of exchanging information related to a preview image between the first and second electronic devices through the second communication (e.g., SWIS communication) according to an embodiment of the present disclosure.

Referring to FIG. 13A, the screens display second communication (e.g., SWIS communication) connection time information 1305. The first electronic device 400 may display a function menu 1310 having menu items related to the operation of the camera in association with the second communication (e.g., SWIS communication). For example, the camera operation-related menu 1310 may include an image capture item, an image recording item, a front/rear camera switching item, a dual camera item, and a pointer function item. The first and second electronic devices 400 and 410 may also display a second communication (e.g., SWIS communication) control menu 1320.

According to various embodiments, the first and second electronic devices 400 and 410 may share the preview image 1315, and the user of the second electronic device 410 may select an area 1323 of the preview image.

Referring to FIG. 13B, the second electronic device 410 may send the first electronic device 400 the information on the area 1323 selected by the user, and the first electronic device 400 may place the focal point on the selected area 1325 of the preview image based on the information received from the second electronic device 410. The first electronic device 400 may transmit to the second electronic device 410 the preview image changing according to the focal point control or the information on the focal point control result in real time or periodically. Such focal point control result information may be generated in the form of digital information which is not displayed on the image or an item indicating the focal point as shown in FIG. 13B. The user of the second electronic device 410 may check the focal point control result information to be transmitted and make an input for transmitting a capture request signal for capturing the screen or a focal point re-request signal 1330 to the first electronic device 400.

According to various embodiments, if the focal point control result information is received from the first electronic device 400, the second electronic device 410 may capture an image from the shared image data (being currently received from the first electronic device 400).

Figure 14A:
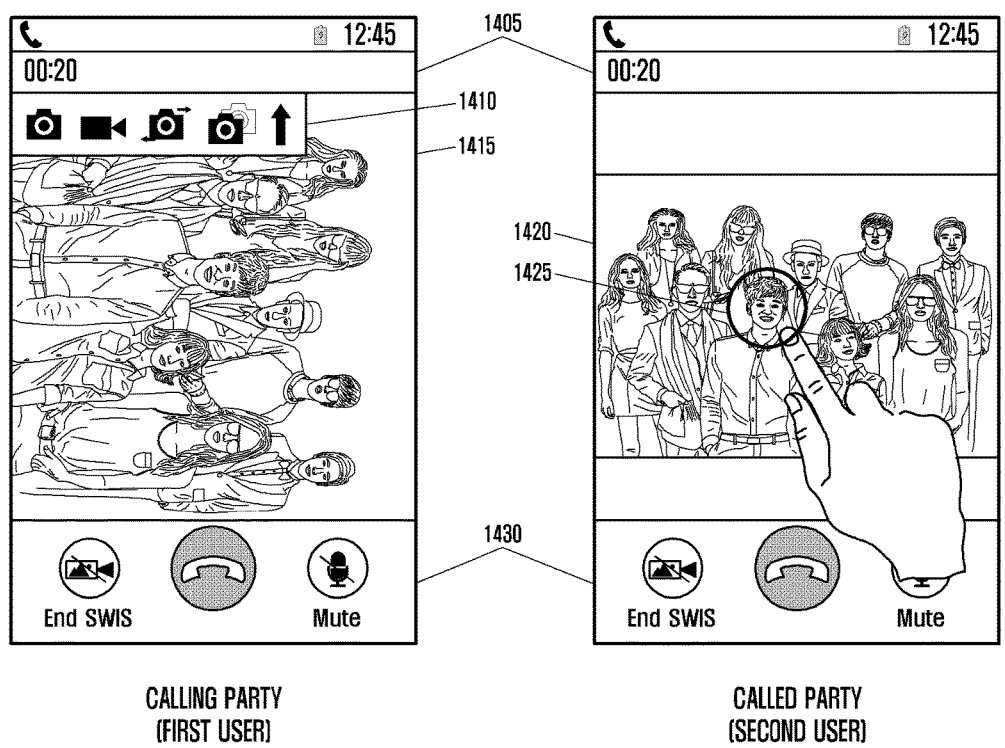
FIGS. 14A, 14B, and 14C are diagrams illustrating screen images for explaining an operation of exchanging a preview image between a first and a second electronic device through a second communication according to another embodiment of the present disclosure.
Figure 14B:
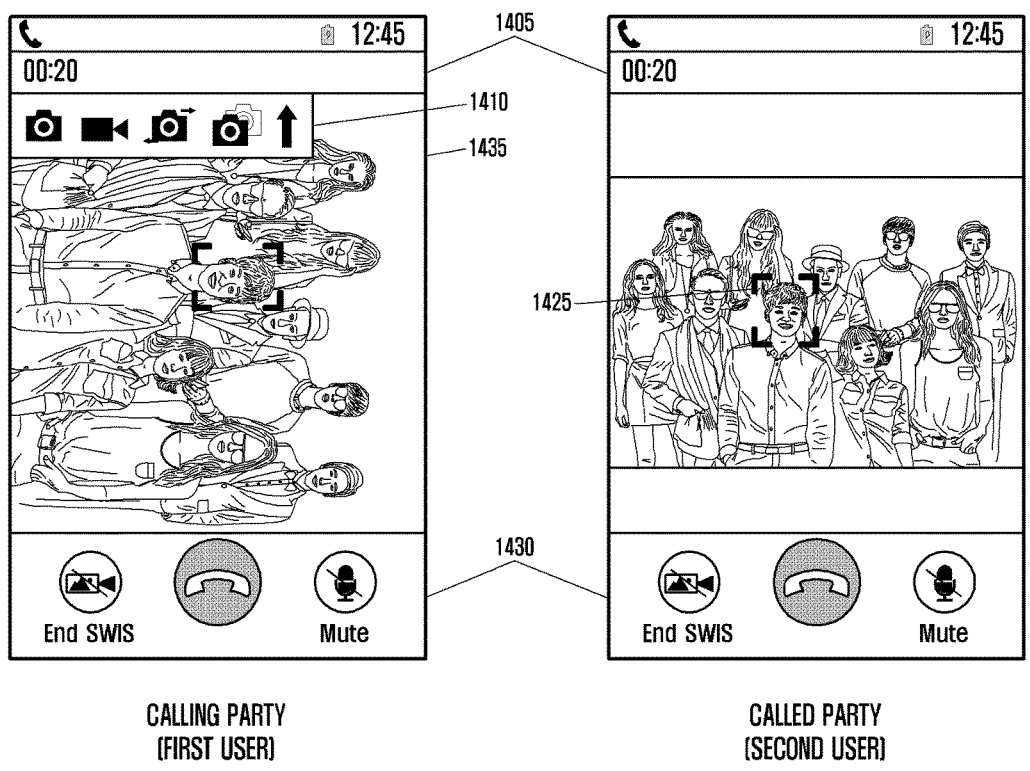

FIGS. 14A and 14B are diagrams illustrating screen images for explaining an operation of exchanging a preview image between a first and a second electronic device through a second communication (e.g., SWIS communication) according to another embodiment of the present disclosure.

Referring to FIG. 14A, the first and second electronic devices 400 and 410 may display second communication (e.g., SWIS communication) connection time information 1405 and a second communication (e.g., SWIS communication) control menu 1430. The first electronic device 400 may display a camera function menu 1410 in the second communication (e.g., SWIS communication) session and a preview image 1415 in a landscape mode. The second electronic device 410 may display the preview image 1420 in a portrait mode and receive an input signal corresponding to a user's touch gesture made for selecting an object 1425. The preview images 1415 and 1420 may be the same image displayed by the first and second electronic devices 400 and 410 in different aspect ratios. The preview images 1415 and 1420 displayed respectively by the first and second electronic devices 400 and 410 may be rotated depending on the screen display mode.

Referring to FIG. 14B, the second electronic device 410 may transmit to the first electronic device 400 the information on the position of the object 1425 selected by the user's touch input, and the first electronic device 400 may output focal point control result information generated based on the information on the position of the object 1425. According to various embodiments, the focal point control information may be transmitted in the form of coordinates of the corresponding position or data such as an image concerning the position.

Figure 14C:
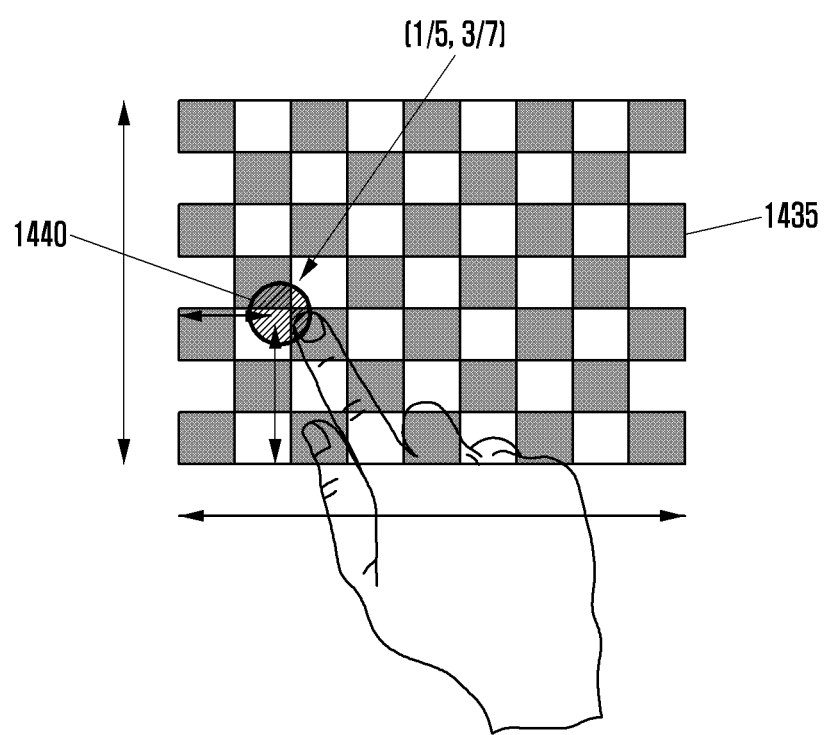

FIG. 14C is a diagram for explaining an operation of a second electronic device for recognizing a position of an object selected by a user on a preview image according to an embodiment of the present.

Referring to FIG. 14C, the second electronic device 410 may check the coordinates or ratio information of the selected position 1440 on the preview image 1435. For example, the second electronic device 410 may check that the coordinates of the selected position 1440 are ⅕ of the horizontal length and ⅗ of the vertical length of the preview image 1435. The second electronic device 410 may send the coordinates or ratio information of the position 1440 selected by the user on the preview image 1435 to the first electronic device 400. In this case, the processor 120 of the first electronic device 400 may select the object in consideration of the coordinates, ratio information, or resolutions supported by the electronic devices in addition to the aspect ratio determined depending on the screen display mode, i.e. landscape mode and portrait mode, of the first electronic device 400.

Figure 15A:
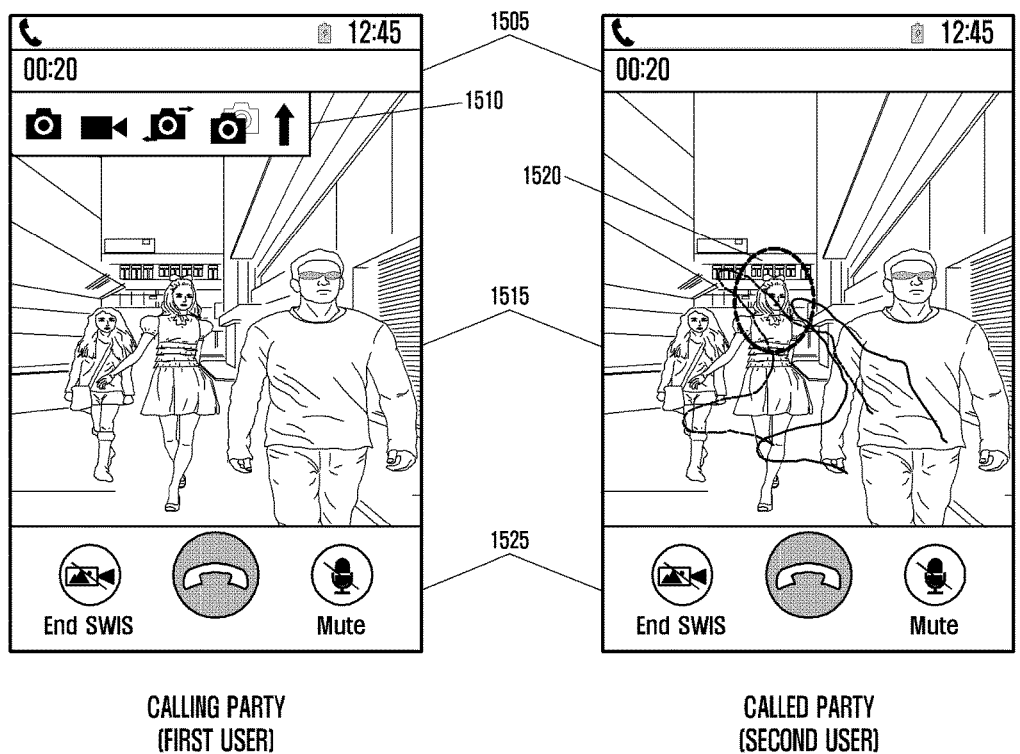
FIGS. 15A and 15B are diagrams illustrating screen images for explaining a procedure for exchanging preview image information between a first and a second electronic device according to another embodiment of the present disclosure.
Figure 15B:
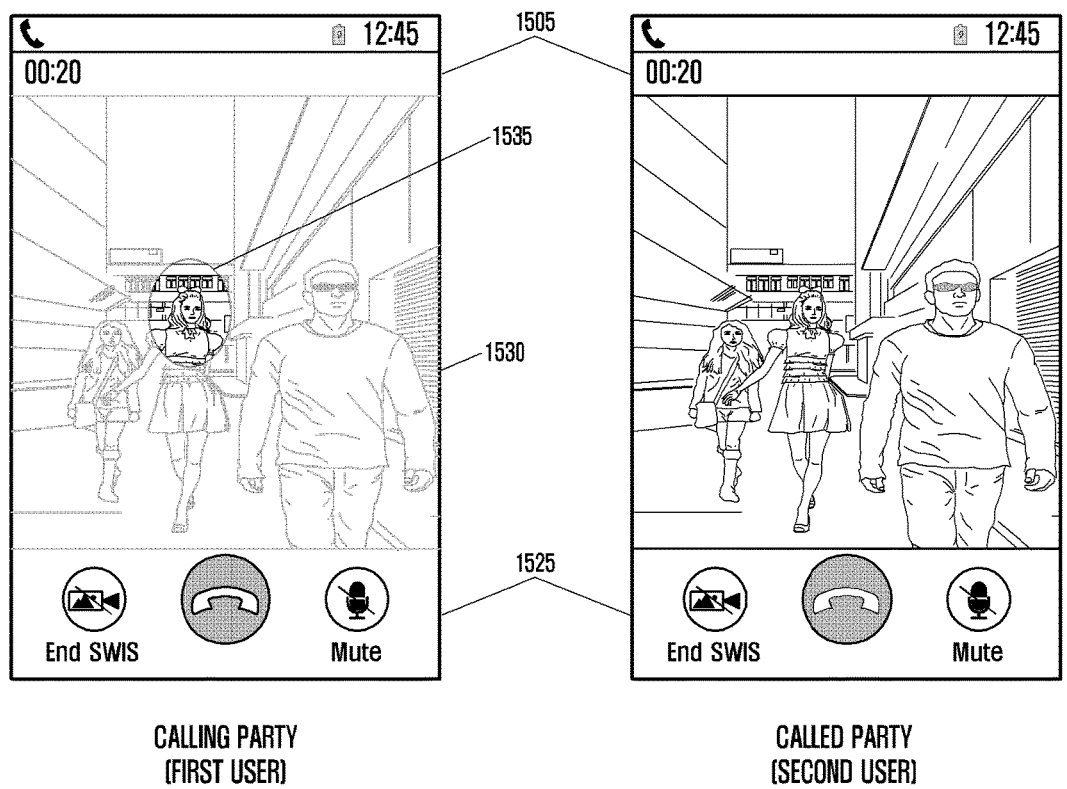

FIGS. 15A and 15B are diagrams illustrating screen images for explaining a procedure for exchanging preview image information between a first and a second electronic device according to another embodiment of the present disclosure.

Referring to FIG. 15A, the first and second electronic devices 400 and 410 may display second communication (e.g., SWIS communication) connection time information 1505, a preview image 1515, and a second communication (e.g., SWIS communication) control menu 1525. The first electronic device 400 may also display a camera function menu 1510 concerning the second communication (e.g., SWIS communication).

According to various embodiments, the second electronic device 410 may receive a user's interactive input for selecting the area 1520. For example, the user of the second electronic device 410 may make a gesture of drawing a closed curve in the form of a circle for selecting the area 1520 on the preview image 1515 using a finger. The processor 120 of the second electronic device 410 may send the first electronic device 400 the information on the area selected by the user.

Referring to FIG. 15B, the first electronic device 400 may perform an output-focusing function on the preview image 1530 with the focal point at the area selected by the user. For example, the processor 120 of the first electronic device 400 may control the camera module 291 to achieve the out-focusing effect 1535 on the preview image 1530 based on the information on the area selected by the user of the second electronic device 410 as shown in FIG. 15A.

Figure 16:
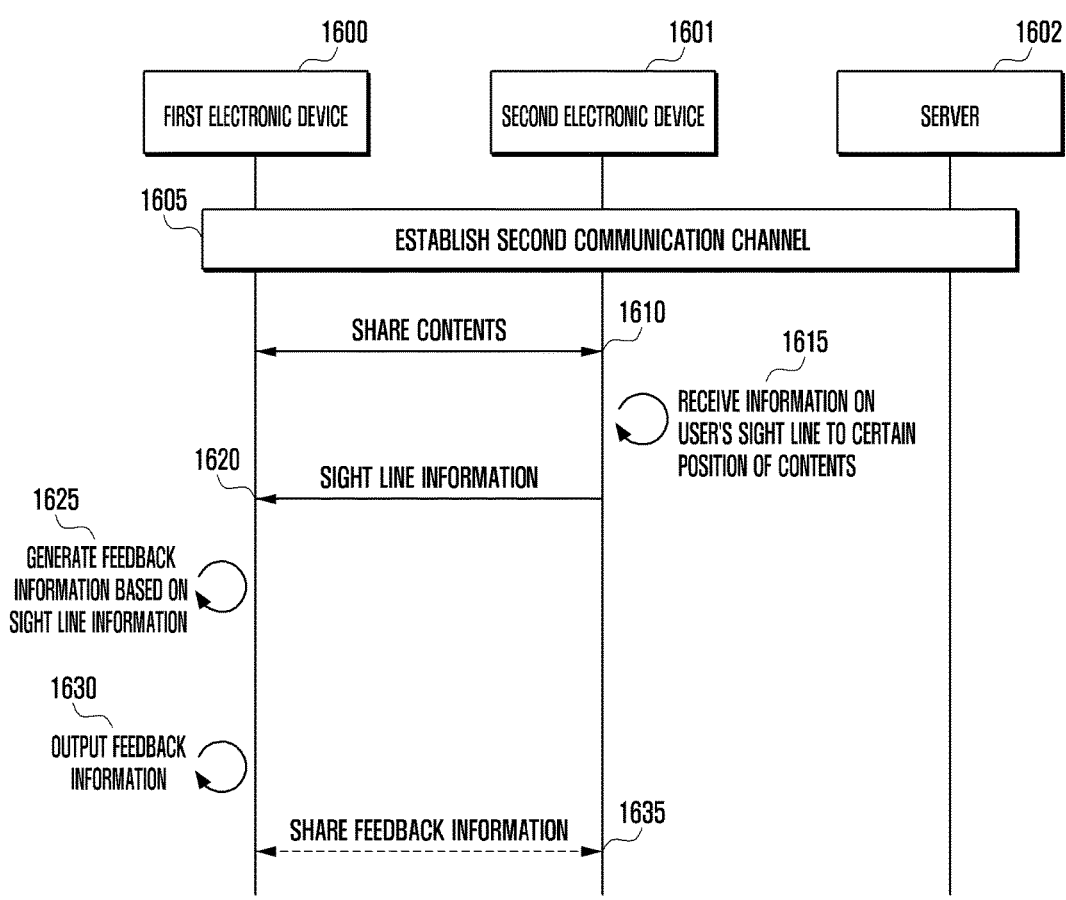
FIG. 16 is a signal flow diagram illustrating a procedure in which a first electronic device receives status information of a second electronic device and transmits feedback information to the second electronic device according to various embodiments of the present disclosure.

FIG. 16 is a signal flow diagram illustrating a procedure in which a first electronic device receives status information of a second electronic device and transmits feedback information to the second electronic device according to various embodiments of the present disclosure.

Referring to FIG. 16, the first and second electronic devices 1600 and 1601 may communicate with each other through the first communication connection (e.g., voice call connection). According to various embodiments, the first and second electronic devices 1600 and 1601 and the server 1602 of FIG. 16 may correspond to the first and second electronic devices 400 and 410 and the server 420 of FIG. 4, respectively.

According to an embodiment, the first and second electronic devices 1600 and 1601 may establish the second communication (e.g., SWIS communication) with the assistance of the server 1602 at operation 1605. According to an embodiment, the first and second electronic devices 1600 and 1601 may share contents at operation 1610.

According to an embodiment, the second electronic device 1601 may check the line of signal of the user to a certain area of the contents at operation 1615. For example, the processor 120 of the second electronic device 1601 may check the line of sight of the user to an object included in the content using at least one of the camera module 291, the sensor module 240, and the line-of-signal recognition algorithms.

According to an embodiment, the second electronic device 1601 may transmit the user's line-of-sight information to the first electronic device 1600 at operation 1620. For example, the processor 120 of the second electronic device 1601 may control the communication interface 170 or the communication module 220 to transmit the information on the second user's line-of-sight to an object of the contents to the first electronic device 1600.

According to an embodiment, the first electronic device 1600 may generate feedback information based on the line-of-sight information received from the second electronic device 1601 at operation 1625. The first electronic device 1600 may output the generated feedback information at operation 1630.

According to various embodiments, the first and second electronic devices 1600 an 1601 may share the feedback information at operation 1635. For example, the first electronic device 1600 may transmit the feedback information to the second electronic device 1601, and the second electronic device 1601 may output the feedback information received from the first electronic device 1600.

Figure 17A:
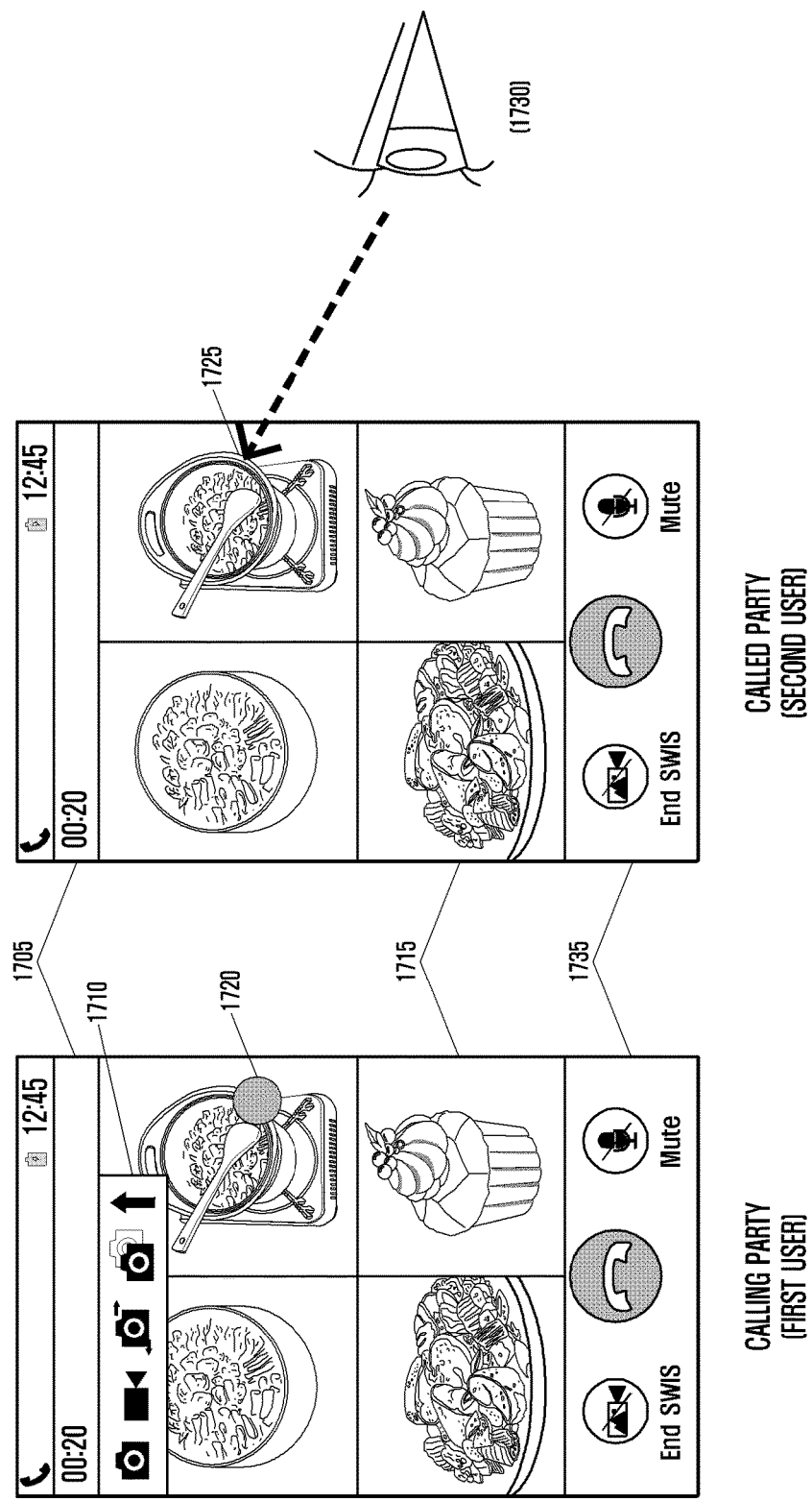
FIGS. 17A and 17B are diagrams illustrating screen images for explaining an operation of a first electronic device for outputting feedback information generated based on information on the user's line-of-sight to the contents displayed on the second electronic device according to an embodiment of the present disclosure.
Figure 17B:
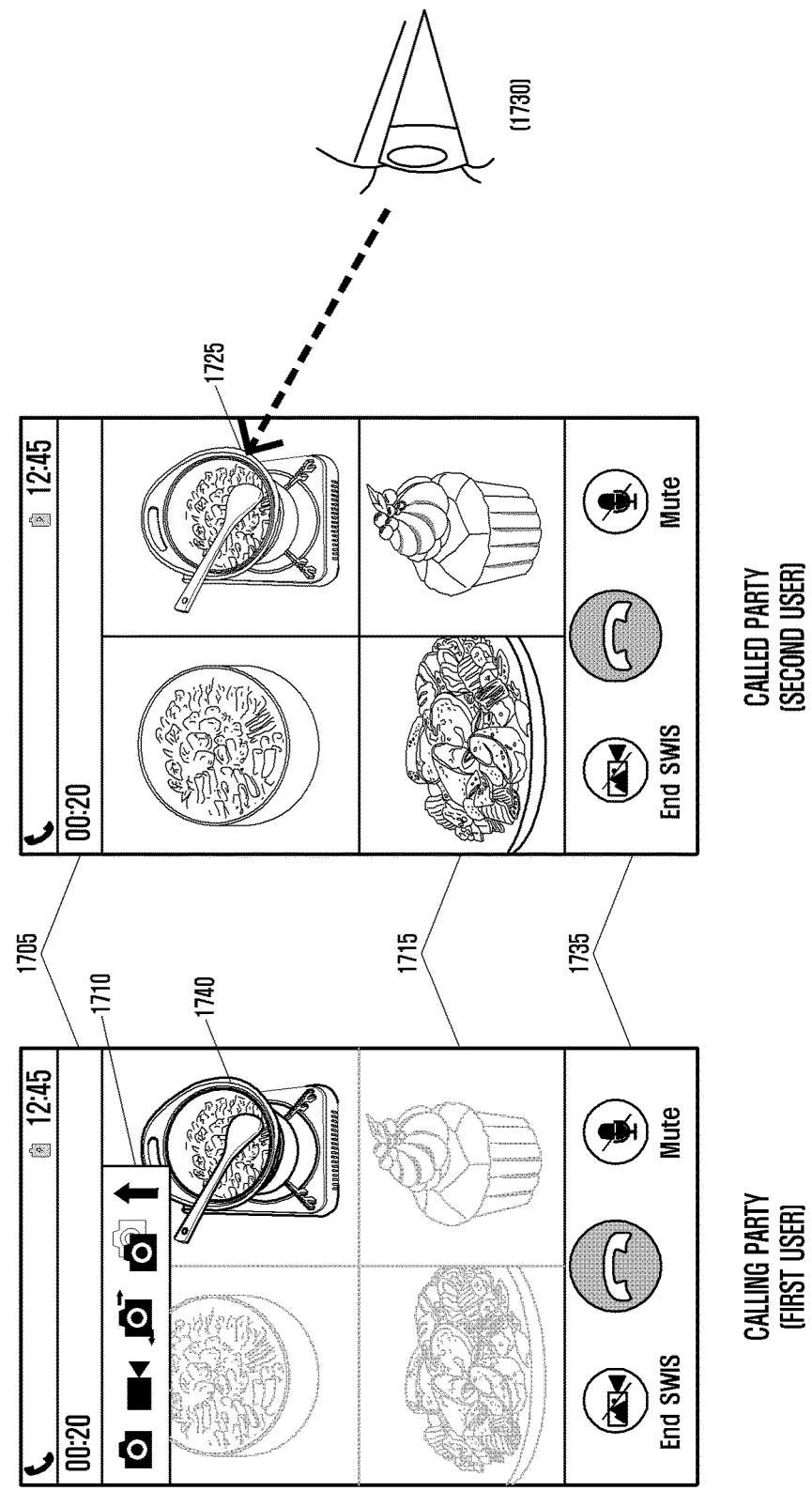

FIGS. 17A and 17B are diagrams illustrating screen images for explaining an operation of a first electronic device for outputting feedback information generated based on the information on the user's line-of-sight to the contents displayed on a second electronic device according to an embodiment of the present disclosure.

Referring to FIG. 17A, the first and second electronic devices 400 and 410 may display the second communication (e.g., SWIS communication) connection time information 1705, the contents 1715, and the second communication (e.g., SWIS communication) control menu 1735; and the first electronic device 400 may further display the camera function menu 1710 concerning the second communication (e.g., SWIS communication). The second electronic device 410 may detect the line of sight of the user 1730 to an object 1725 of the contents 1715. The second electronic device 410 may transmit the detected line-of-sight information to the first electronic device 400, and the first electronic device 400 may modify the contents based on the line-of-sight information received from the second electronic device 410.

According to various embodiments, the first electronic device 400 may display a pointer 1720 on the object 1720 corresponding to the object 1725 to which the line of sight of the second user is oriented as shown in FIG. 17A. According to various embodiments, the first electronic device 400 may adjust the resolution of the contents 1715 particularly around the object 1740 corresponding to the object 1725 to which the line of sight of the second user is oriented as shown in FIG. 17B. For example, the processor 120 of the first electronic device 400 may control the user interface (e.g., display 160) to display the area corresponding to the object 1725 more clear than the other area of the contents 1715.

Figure 18:
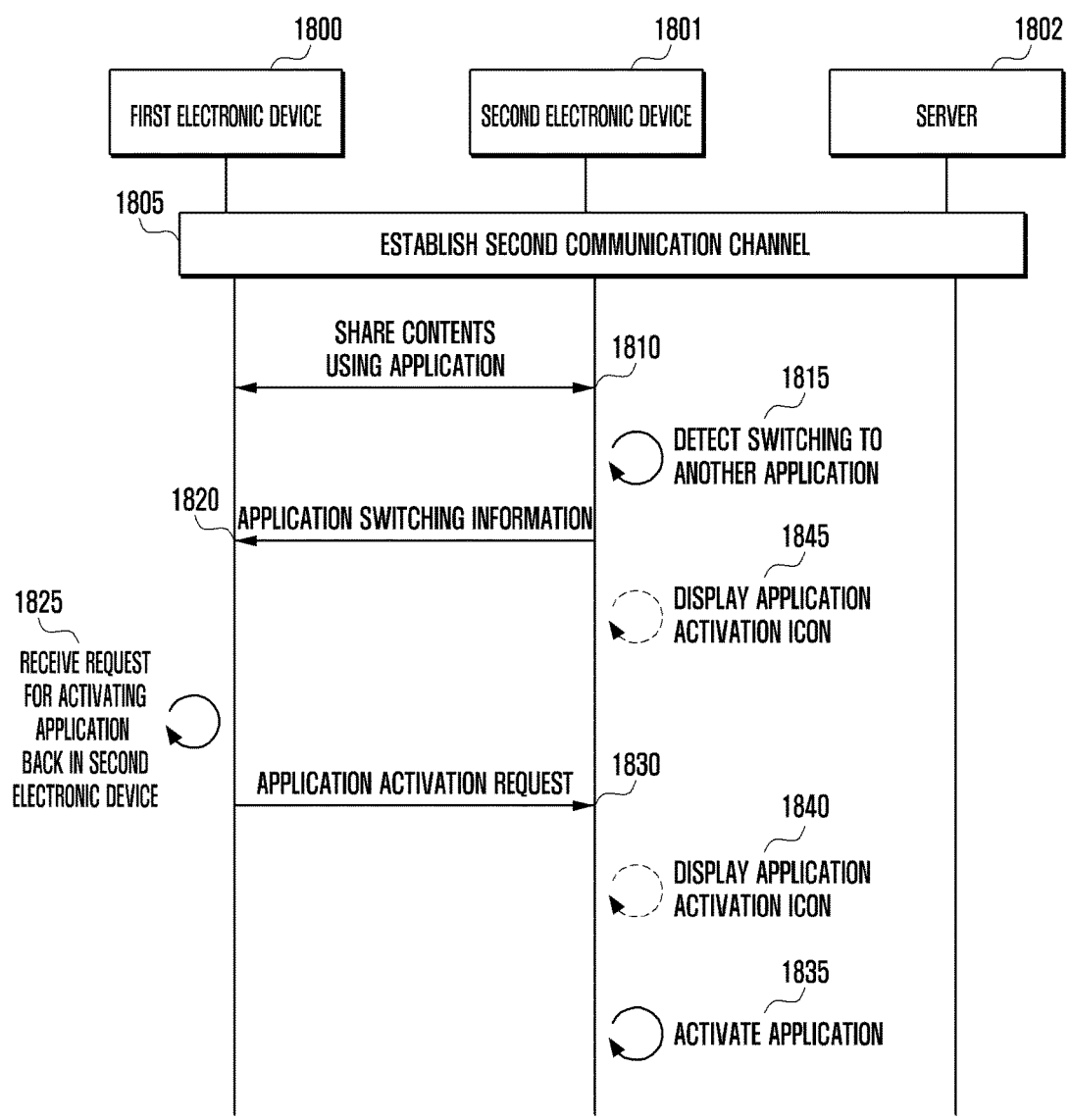
FIG. 18 is a signal flow diagram illustrating a procedure in which a first and a second electronic device switch between second communication-related applications (e.g., "See What I See" (SWIS) applications) according to various embodiments of the present disclosure.

FIG. 18 is a signal flow diagram illustrating a procedure in which a first and a second electronic device switch between second communication-related applications (e.g., SWIS applications) according to various embodiments of the present disclosure. According to various embodiments, the first and second electronic devices 1800 and 1801 and the server 1802 of FIG. 18 may correspond to the first and second electronic devices 400 and 410 and the server 420 of FIG. 4, respectively.

Referring to FIG. 18, the first and second electronic devices 1800 and 1801 may establish the second communication (e.g., SWIS communication) channel with the assistance of the server 1802 at operation 1805. According to an embodiment, the first and second electronic devices 1800 and 1801 may share contents through the SWIS channel by executing a second communication-related application (e.g., SWIS application) at operation 1810.

According to an embodiment, the second electronic device 1801 may detect that the second communication-related application (e.g., SWIS application) is switched to another application at operation 1815. The processor 120 of the second electronic device 1801 may detect that the second communication-related application (e.g., SWIS application) running in the foreground is switched to the background when another application is executed. In this case, the second electronic device 1801 may transmit application switching information to the first electronic device 1800 at operation 1820. For example, the processor 120 of the second electronic device 1801 may transmit to the first electronic device 1800 the information indicating that the second communication-related application (e.g., SWIS application) is running in the background and another application is running in the foreground.

According to an embodiment, the first electronic device 1800 may receive a request for activating the second communication-related application (e.g., SWIS application) from the second electronic device 1801 at operation 1825. According to various embodiments, the first electronic device 1800 may output notification that the second communication-related application (e.g., SWIS application) is running in the background of the second electronic device 1801. For example, the processor 120 of the first electronic device 1800 may output the feedback information generated based on the information received from the second electronic device 1801. Here, the feedback information may be generated in the form of a UI presenting the information that the second communication-related application (e.g., SWIS application) running on the second electronic device 1801 is switched to the background because of the execution of another application. The user of the first electronic device 1800 may make an input to the first electronic device 1800 to activate the second communication-related application (e.g., SWIS application) to operate in the foreground.

According to an embodiment, the first electronic device 1800 may transmit to the second electronic device 1801 a second communication-related application (e.g., SWIS application) activation request signal at operation 1830. The second electronic device 1801 may return the second communication-related application (e.g., SWIS application) running in the background to the foreground upon receipt of the activation request signal received from the first electronic device 1800 at operation 1835.

According to various embodiments, if the second communication-related application (e.g., SWIS application) activation request signal is received from the first electronic device 1800, the second electronic device 1801 may display a second communication-related application (e.g., SWIS application) activation icon at operation 1840. In order to accomplish this, the first electronic device 1800 may transmit to the second electronic device 1801 a signal requesting for displaying the second communication-related application (e.g., SWIS application) switching icon on the user interface (e.g., display 160) of the second electronic device 1801. If a user input made to the second communication-related application (e.g., SWIS application) switching icon is detected, the second electronic device 1801 may switch the second communication-related application (e.g., SWIS application) to the foreground and display a second communication-related application (e.g., SWIS application) function execution screen.

According to various embodiments, the second electronic device 1801 may display a second communication-related application (e.g., SWIS application) activation icon on its display at operation 1845. The processor 120 of the second electronic device 1801 may detect that the second communication-related application (e.g., SWIS application) is switched to the background because of the execution of another application. In this case, the processor 120 of the second electronic device 1801 may display a second communication-related application (e.g., SWIS application) activation icon on the user interface (e.g., display 160). If the user makes an input for selecting the second communication-related application (e.g., SWIS application) activation icon, the processor 120 of the second electronic device 1801 may switch the second communication-related application (e.g., SWIS application) to the foreground and display the second communication-related application (e.g., SWIS application) execution screen.

According to various embodiments, the second electronic device 1801 may detect that the screen shared with the first electronic device 1800 is displayed on a low layer or overlapped with at least one execution screens of other applications according to execution of another application at operation 1815. For example, if a window occupying at least one area of the screen such as SMS and naughty application is displayed while sharing the screen with the first electronic device 1800, the second electronic device 1801 may detect that the screen shared with the first electronic device 1800 is covered as much as a size determined at a predetermined ratio. In this case, the second electronic device 1801 may transmit to the first electronic device 1800 the information indicating that the screen shared with the first electronic device 1800 is covered at a predetermined ratio.

Figure 19A:
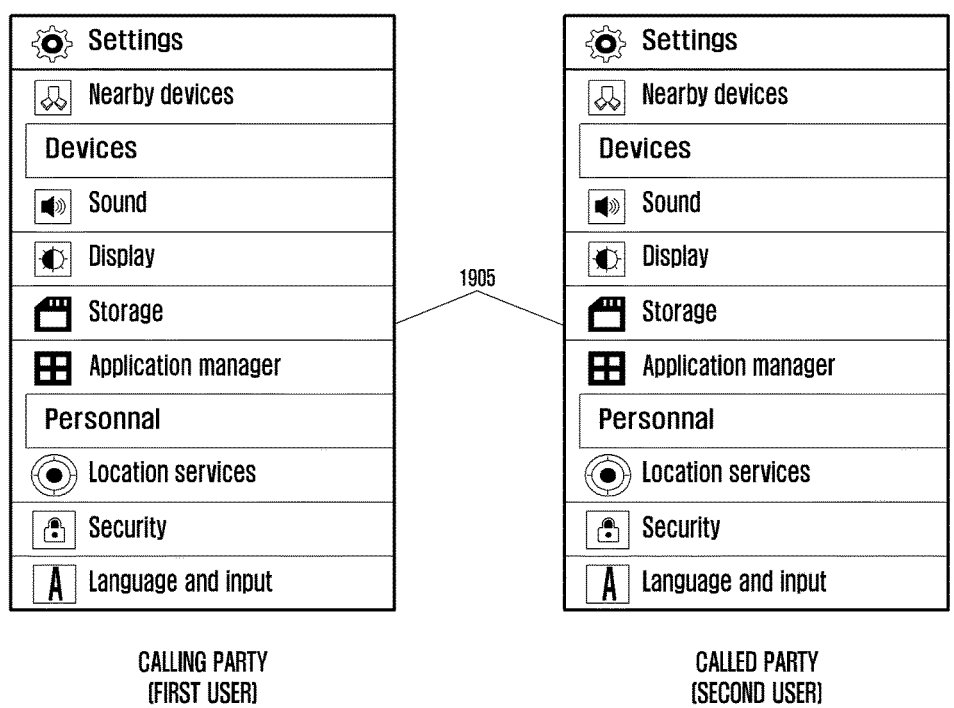
FIGS. 19A and 19B are diagrams illustrating screen images for explaining an operation of transmitting a second communication-related application (e.g., SWIS application) activation request from a first electronic device to a second electronic device when the second communication-related application (e.g., SWIS application) running on the second electronic device is switched to the background according to various embodiments of the present disclosure.
Figure 19B:
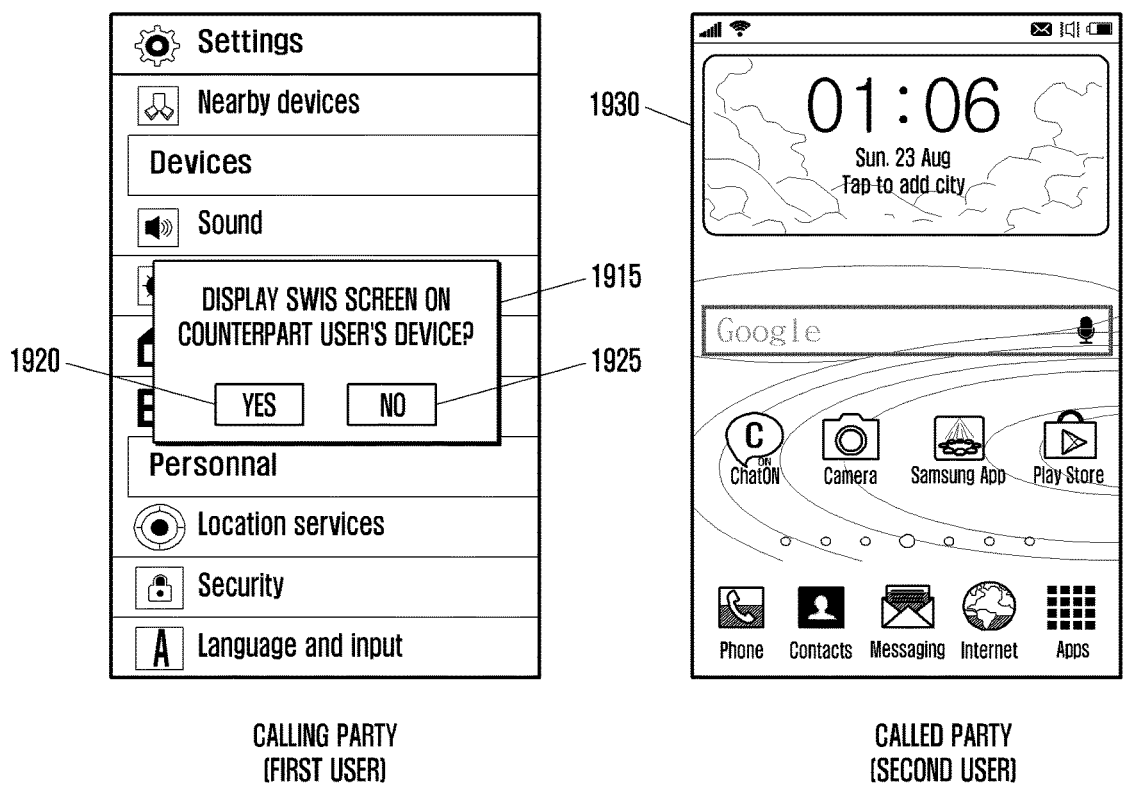

FIGS. 19A and 19B are diagrams illustrating screen images for explaining an operation of transmitting a second communication-related application (e.g., SWIS application) activation request from a first electronic device to a second electronic device when the second communication-related application (e.g., SWIS application) running on the second electronic device is switched to the background.

Referring to FIGS. 19A and 19B, the first and second electronic devices 400 and 410 may share the contents 1905 via the second communication (e.g., SWIS communication). Afterward, the second communication-related application (e.g., SWIS application) running on the second electronic device 410 may be switched to the background or terminated. For example, if the user may push a home button, the second electronic device 410 may execute a home application such that the home screen 1930 is displayed, and the processor 120 of the second electronic device may control the second communication-related application (e.g., SWIS application) program to be switched to the background.

The second electronic device 410 may transmit to the first electronic device 400 the information indicating that the second communication-related application (e.g., SWIS application) running in the foreground is switched to the background. Thus, the execution screen of the second communication-related application (e.g., SWIS application) is not displayed any more. The first electronic device 400 may generate feedback information based on the information received from the second electronic device 410. For example, the first electronic device 400 may display a pop-up window 1915 asking whether to switch the second communication-related application (e.g., SWIS application) running in the background to the foreground. If the user selects a "YES" button 1920 on the pop-up window, the first electronic device 400 may transmit to the second electronic device 410 a signal requesting for switching the second communication-related application (e.g., SWIS application) running in the background to the foreground. Although not shown in the drawing, the second electronic device 410 may switch the second communication-related application (e.g., SWIS application) running in the background to the foreground and display the execution screen of the second communication-related application (e.g., SWIS application) in response to an activation request signal received from the first electronic device 400 as shown in FIG. 19A. If the user selects a "NO" button 1925 on the pop-up window, the first electronic device 400 may wait for another user input without any action.

Figure 20A:
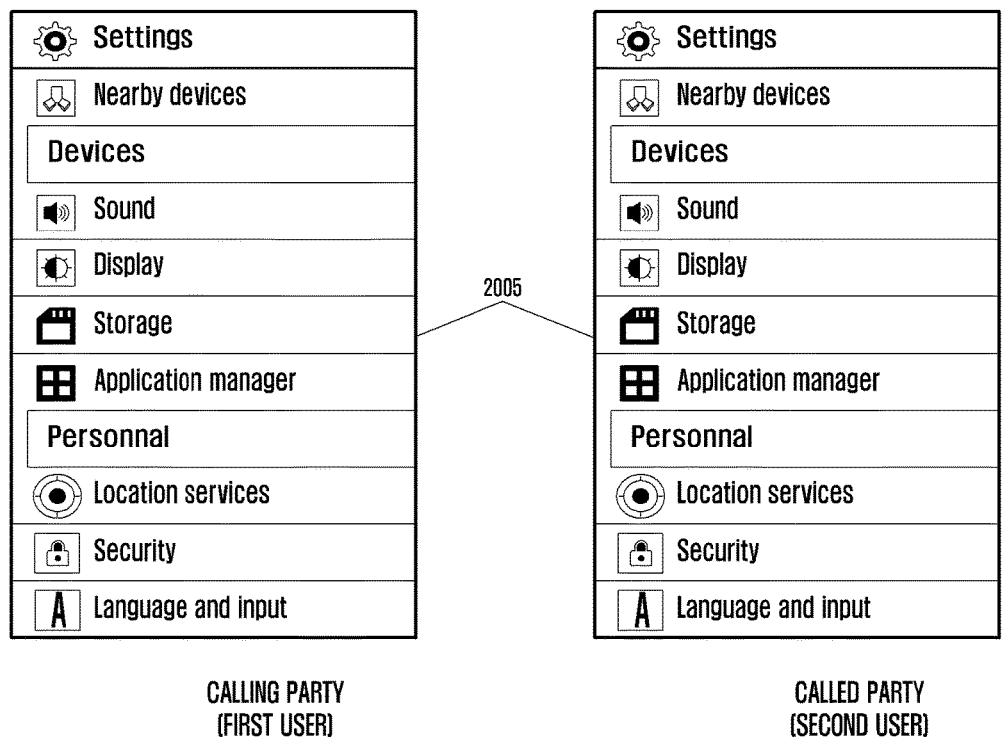
FIGS. 20A, 20B, and 20C are diagrams illustrating screen images for explaining an operation in which a first electronic device guides, when a second communication-related application (e.g., SWIS application) running on a second electronic device is switched to the background, the second electronic device to switch the second communication-related application (e.g., SWIS application) to the foreground according to various embodiments of the present disclosure.
Figure 20B:
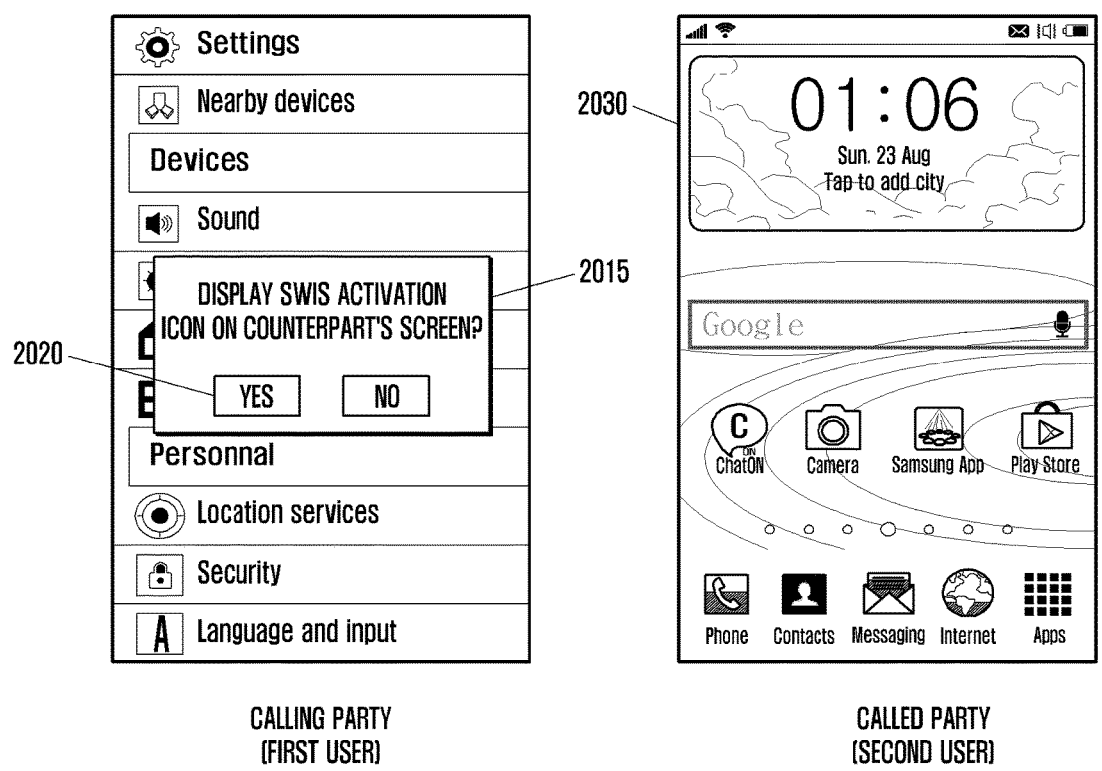
Figure 20C:
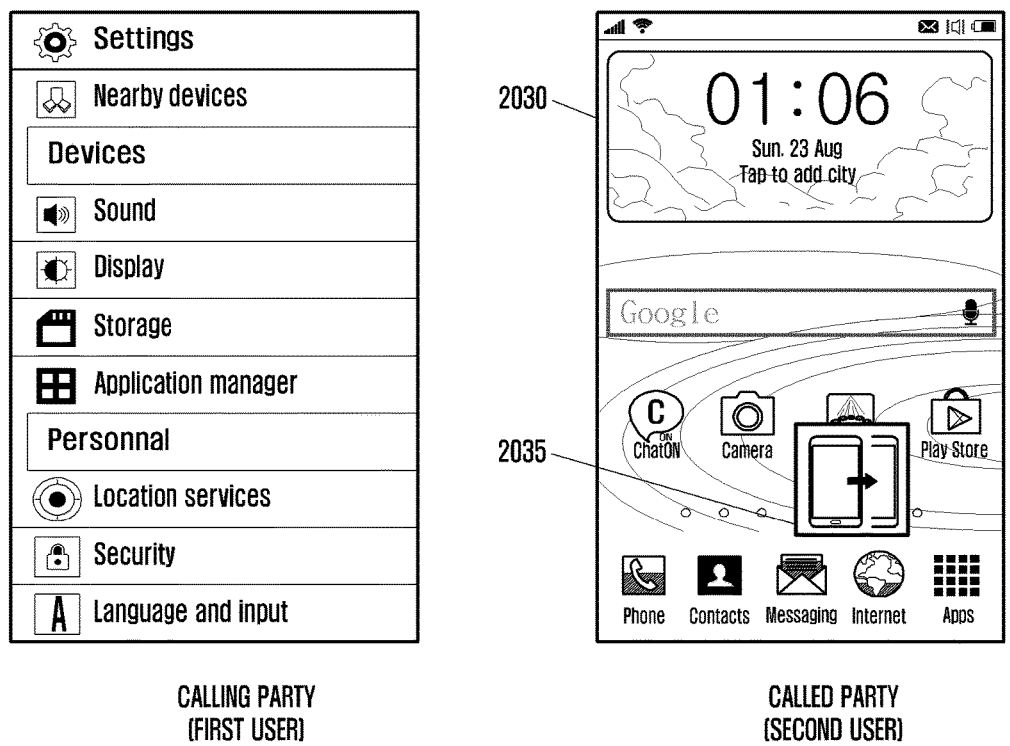

FIGS. 20A, 20B, and 20C are diagrams illustrating screen images for explaining an operation in which a first electronic device guides, when a second communication-related application (e.g., SWIS application) running on a second electronic device is switched to the background, the second electronic device to switch the second communication-related application (e.g., SWIS application) to the foreground.

Referring to FIGS. 20A to 20C, the first and second electronic devices 400 and 410 may share the contents 2005 through the second communication (e.g., SWIS communication). Afterward, the second communication-related application (e.g., SWIS application) running on the second electronic device 410 may be switched to the background or terminated as shown in FIG. 20B. For example, the second electronic device 410 may display the home screen 2030 according to execution of the home application and switch the second communication-related application (e.g., SWIS application) to the background.

The second electronic device 410 may switch the second communication-related application (e.g., SWIS application) running in the foreground to the background and transmit to the first electronic device 400 the information indicating that the execution screen of the second communication-related application (e.g., SWIS application) is not displayed. The first electronic device 400 may generate feedback information based on the information received from the second electronic device 410. For example, the first electronic device 400 may display a pop-up window 2015 asking whether to present a second communication-related application (e.g., SWIS application) activation icon on the screen of the second electronic device 410. If the user selects a "YES" button 2020 on the pop-up window, the first electronic device 400 may transmit to the second electronic device 410 a signal requesting for displaying the second communication-related application (e.g., SWIS application) activation icon. In this case, the second electronic device 410 may display the second communication-related application (e.g., SWIS application) activation icon as shown in FIG. 20C. If a user input (e.g., a touch gesture) for selecting the activation icon 2035 is detected, the second electronic device 410 may switch the second communication-related application (e.g., SWIS application) running in the background to the foreground and display the execution screen of the second communication-related application (e.g., SWIS application).

Figure 21:
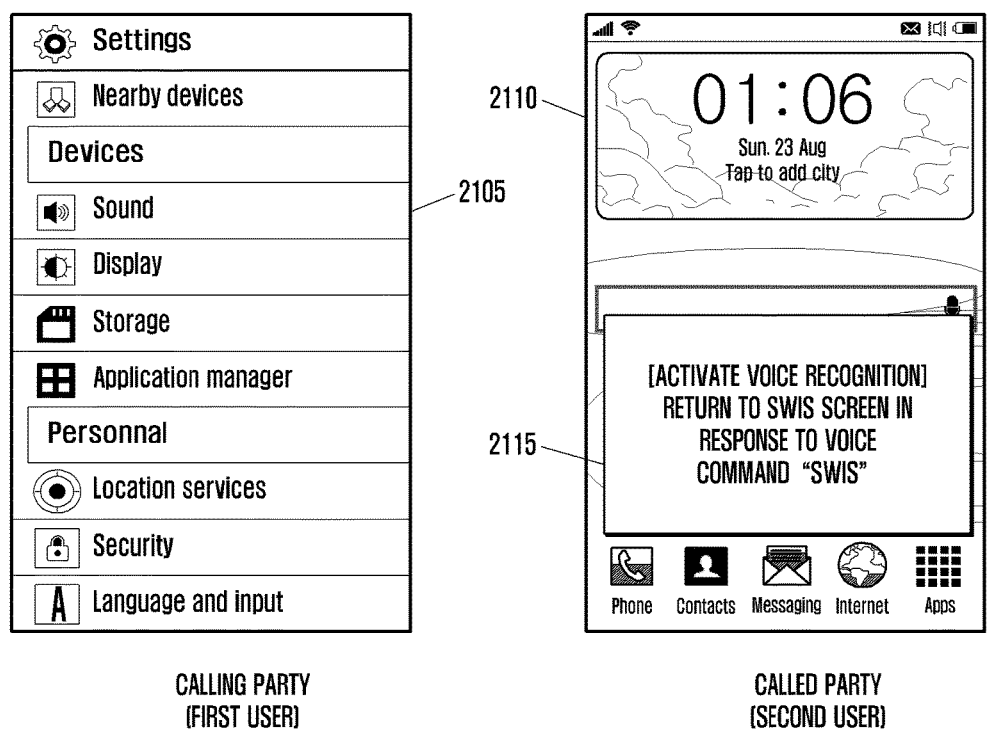
FIG. 21 is a diagram illustrating screen images for explaining an operation of switching, when a second communication-related application (e.g., SWIS application) running on a second electronic device is switched to the background, the second communication-related application (e.g., SWIS application) back to the foreground in response to voice recognition according to various embodiments of the present disclosure.

FIG. 21 is a diagram illustrating screen images for explaining an operation of switching, when a second communication-related application (e.g., SWIS application) running on a second electronic device is switched to the background, the second communication-related application (e.g., SWIS application) back to the foreground in response to voice recognition.

Referring to FIG. 21, while the contents 2105 are shared between the first and second electronic devices 400 and 401 through the second communication (e.g., SWIS communication), the second communication-related application (e.g., SWIS application) running on the second electronic device 410 may be switched to the background.

The processor 120 of the second electronic device 410 may activate a voice recognition function in response to a request received from the first electronic device 400 or generated at the second electronic device 410. For example, the processor 120 of the second electronic device 410 may activate the voice recognition function, when the second communication-related application (e.g., SWIS application) is running in the background, and display a pop-up window 2115 on a home screen 2110 to inform that the second communication-related application (e.g., SWIS application) can be activated by a predetermined voice command. If the predetermined voice command (e.g., "SWIS") is spoken by the user, the processor 120 of the second electronic device 410 controls the second electronic device 410 to operate the second communication-related application (e.g., SWIS application) in the foreground and the user interface (e.g., display 160) of the second electronic device 410 to display the execution screen of the second communication-related application (e.g., SWIS application).

Figure 22A:
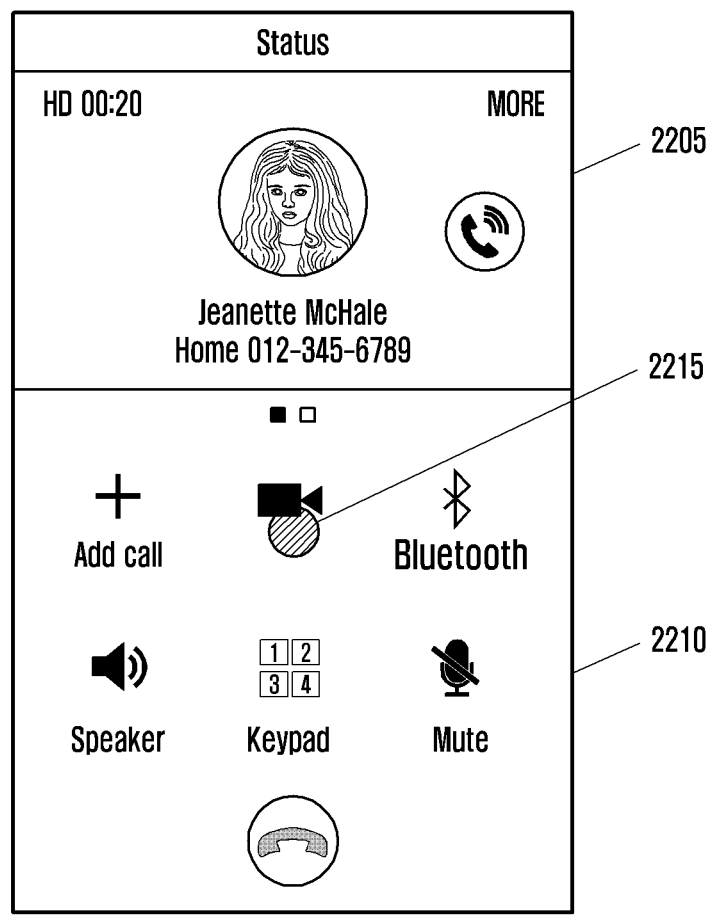
FIGS. 22A, 22B, and 22C are screen images for explaining an operation for a first electronic device to release a first communication connection and establish only a second communication according to various embodiments of the present disclosure.
Figure 22B:
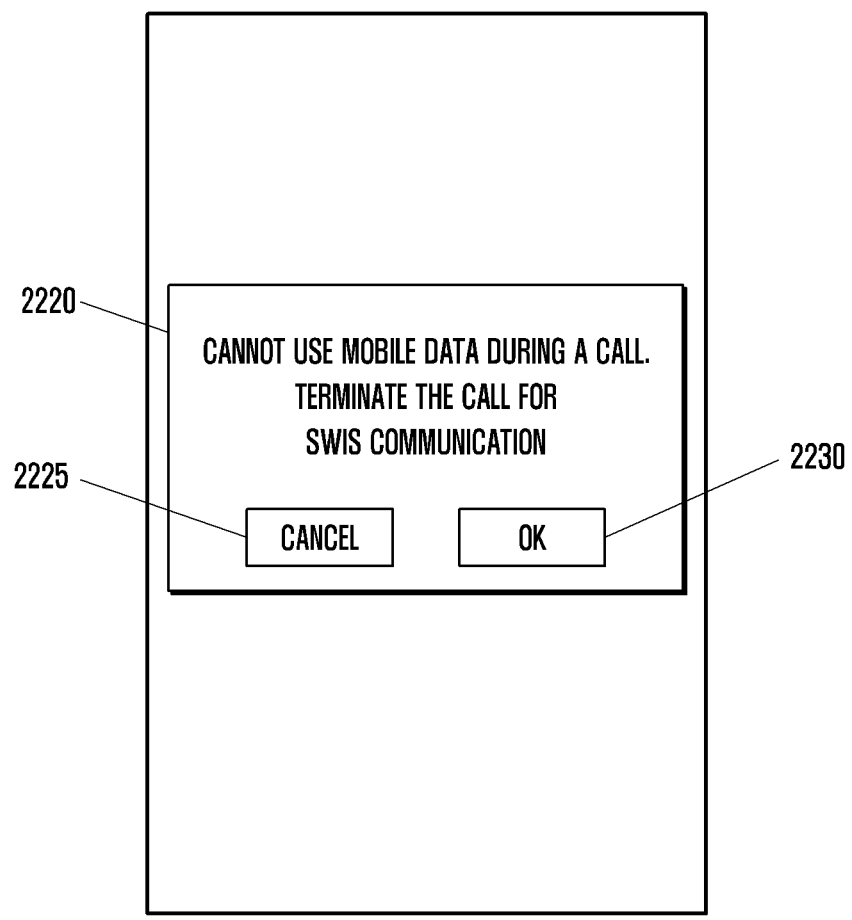
Figure 22C:
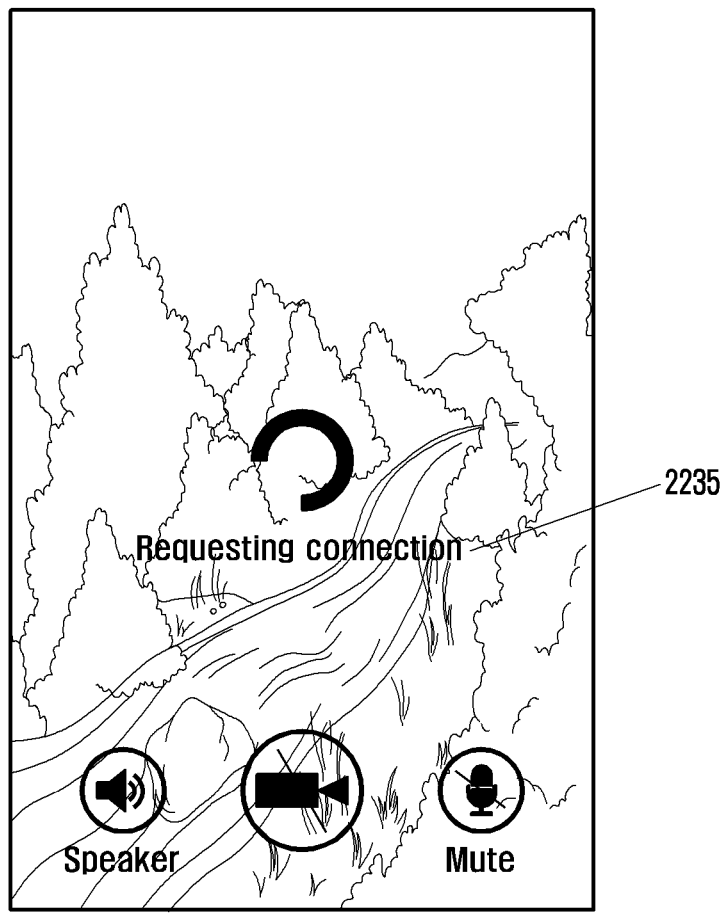

FIGS. 22A to 22C are screen images for explaining an operation for a first electronic device to release a first communication connection and establish only a second communication (e.g., SWIS communication) according to various embodiments of the present disclosure.

Referring to FIGS. 22A to 22C, the first electronic device 410 may display the window 2205 presenting the information indicating that a voice call with the second electronic device 410 is in progress through the first communication channel 430 and the window 2210 presenting various functions supported by the first electronic device 400. The function window 2210 of the first electronic device 400 may include the SWIS connection icon 2215.

In the case where a problem occurs in any of various communication networks, the first electronic device 400 may display the pop-up window 2220 notifying that the first communication and the second communication (SWIS communication) cannot be performed simultaneously as shown in FIG. 22B in response to a user input for selecting the SWIS connection icon 2215 as shown in FIG. 22A. The pop-up window 2220 may present the "OK" button 2230 and the "Cancel" button 2225 along with the text message informing of the release of the first communication connection. If the user selects the "OK" button 2230, the first electronic device 400 may terminate the voice call, request for the second communication connection, and display a second communication connection request screen 2235 as shown in FIG. 22C. In this case, the first and second electronic devices 400 and 410 may establish the second communication (e.g., SWIS communication) without voice call connection. According to various embodiments, if only the second communication (e.g., SWIS communication) connection is established, the first electronic device 400 may transmit to the second electronic device 410 the user's voice signal through the second communication (e.g., SWIS communication) channel. For example, the processor 120 of the first electronic device 400 may collect voice data of the user by means of the audio module 280 of the first electronic device 400 and convert the collected voice data to a digital signal which is transmitted to the second electronic device 410.

In the above configuration, although the first and second electronic devices 400 and 410 are connected only through the second communication (e.g., SWIS communication) because of a network problem, they may share the voice signal or data corresponding to the voice signal. For example, the voice signal may be converted to text using a Speech To Text (STT) algorithm.

Although FIGS. 4 to 22C are directed to the case where the second communication connection is established in the state that the first communication connection has already been established, the present disclosure is not limited thereto. For example, the first electronic device 400 may establish the second communication connection with a previously established first communication connection. In this case, the first and second electronic devices 400 and 410 may establish the second communication connection without a previously established first communication connection to share the contents information.

FIG. 23 is a signal flow diagram illustrating a procedure for establishing a second communication connection without a previously established first communication connection between a first and a second electronic device according to various embodiments of the present disclosure.

Referring to FIG. 23, the first and second electronic devices 2300 and 2301 and the server 2302 of FIG. 23 may correspond to the first and second electronic devices 400 and 410 and the server 420 of FIG. 4.

According to an embodiment, the first electronic device 2300 may execute an application (e.g. SWIS application) for sharing contents such as video in response to a user's request at operation 2305.

According to an embodiment, the first electronic device 2300 may transmit to the server 2302 a communication (e.g., SWIS communication) invite message for sharing contents with the second electronic device 2301 at operation 2310.

According to an embodiment, the server 2302 may forward the communication (e.g., SWIS communication) invite message received from the first electronic device 2300 to the second electronic device 2301 at operation 2315.

According to an embodiment, the second electronic device 2301 may transmit an acknowledgement message to the server 2302 at operation 2320. According to an embodiment, the second electronic device 2301 may execute a communication application (e.g., SWIS application) for sharing contents at operation 2325.

According to an embodiment, the server 2302 may forward the acknowledgement message received from the second electronic device 2301 to the first electronic device 2300 at operation 2330.

According to an embodiment, the server 2302 may establish the communication (e.g., SWIS communication) channel such that the first and second electronic devices 2300 and 2301 communicate data through the communication (e.g., SWIS communication) channel for sharing contents at operation 2335. According to various embodiments, the communication (e.g., SWIS communication) channel for sharing contents may be a P2P communication channel.

According to an embodiment, the first and second electronic devices 2300 and 2301 may share contents through the communication (e.g., SWIS communication) channel at operation 2340. According to various embodiments, the first electronic device 2300 may share the contents with the server 2302 at operation 2345. For example, the first electronic device 2300 may upload the contents to the server 2302. In this case, although not shown in the drawing, the second electronic device 2301 may download the shared contents from the server 2302.

According to an embodiment, the processor 120 of the second electronic device 2302 may detect at least one of an input made to the contents and status information of the second electronic device 2302 at operation 2350.

According to an embodiment, the second electronic device 2301 may transmit the detected status information to the first electronic device 2300 at operation 2355. According to an embodiment, the second electronic device 2301 may upload the status information to the server 2302 at operation 2360.

According to an embodiment, the first electronic device 2300 may download the uploaded status information from the server at operation 2365. According to an embodiment, the first electronic device 2300 may generate feedback information at operation 2370. According to an embodiment, the first electronic device 2300 may display the feedback information at operation 2375. According to an embodiment, the first and second electronic devices 2300 and 2301 may share the feedback information at operation 2380.

The procedure of FIG. 23 may include the embodiment of FIG. 8 with the exception that the second communication (e.g., SWIS communication) can be performed without a previously established first communication (e.g., voice call). According to various embodiments, the first communication (e.g., voice call) connection may be established at any time point in FIG. 23.

The information sharing method of the electronic device 101 according to an embodiment of the present disclosure may include establishing communication connection with an external electronic device through the first and second communication channels 430 and 440, transmitting contents to the external device through the second communication channel, receiving information input to the external device in association with the contents and/or status information of the external electronic device; and generating feedback information related to the contents based on at least one of the input information and the status information.

In the information sharing method of the electronic device 101 according to an embodiment of the present disclosure, establishing the communication connection with the external electronic device through the second communication channel 440 may include transmitting a request for establishing the second communication channel 440 to the server 420 and establishing the communication connection with the external electronic device directly through the second communication channel 440.

In the information sharing method of the electronic device 101 according to an embodiment of the present disclosure, establishing the communication connection with the external electronic device through the second communication channel 440 includes transmitting a request for establishing the second communication channel 440 to the server 420, checking whether an acknowledgement message transmitted by the external electronic device is received from the server 420 in a predetermined time period, and releasing, when the acknowledgement message is not received in the predetermined time period, the first communication connection.

The information sharing method of the electronic device 101 according to an embodiment of the present disclosure may further include releasing, when information indicating that the first and second communication channels 430 and 440 cannot be established simultaneously, the first communication channel 430, transmitting, when the first communication channel 430 is released, a voice signal collected by the electronic device 101 to the external electronic device through the second communication channel 440, and outputting the voice signal received from the external electronic device through the second communication channel 440.

The information sharing method of the electronic device 101 according to an embodiment of the present disclosure may include establishing a communication connection with an external electronic device through the first and second communication channels 430 and 440, receiving contents from the external electronic device through the second communication channel 440, outputting the received contents, and transmitting at least one of information input to the electronic device in association with the contents and status information of the electronic device 101 to the external electronic device through the second communication channel 440. Transmitting the status information of the electronic device 101 to the external electronic device may include transmitting, when a screen with the contents turns off or is switched to another screen without the contents, information indicating that the contents are not shared as the status information of the electronic device 101 to the external electronic device.

In the information sharing method of the electronic device 101 according to an embodiment of the present disclosure, transmitting the status information of the electronic device 101 to the external electronic device may include detecting whether user's face contacts the electronic device 101 and transmitting, when the user's face does not contact the electronic device 101, information indicating that the user is not paying attention to the contents as the status information of the electronic device to the external electronic device.

In the information sharing method of the electronic device 101 according to an embodiment of the present disclosure, the contents may include a preview image taken by a camera module of the external electronic device, and transmitting the status information of the electronic device 101 to the external electronic device may include transmitting user's interactive input made to the preview image displayed on the electronic device 101 as the status information of the electronic device to the external electronic device.

In the information sharing method of the electronic device 101 according to an embodiment of the present disclosure, transmitting the status information of the electronic device 101 to the external electronic device may include collecting information on sight line of the user to at least part of the contents displayed by the electronic device 101 and transmitting the collected user's sight line information as the status information of the electronic device 101 to the external electronic device.

As described above, the electronic devices and content sharing methods thereof according to various embodiments of the present disclosure are advantageous in that the user of the electronic device is capable of presenting contents to a counterpart user by receiving status information concerning the electronic device of the counterpart user.

The term "module" used in the present disclosure may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the present disclosure may include at least one of an application-specific IC (ASIC) chip, a field-programmable gate arrays (FPGA), and a programmable-logic device for performing operations which has been known and/or are to be developed.

According to various embodiments, at least some of the devices (e.g., modules or functions thereof) or the method (e.g., operations) according to the present disclosure may be implemented by a command stored in a computer-readable storage medium in a programming module form. When the instructions are executed by at least one processor (e.g., the processor 120), the at least one processor may perform functions corresponding to the instructions. The computer-readable storage medium may be, for example, the memory 130. At least a part of the programming module may be implemented (e.g., executed) by, for example, the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction (e.g., programming module), such as a ROM, a RAM, a flash memory and the like. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations. Although the audio processing method and electronic device for supporting the same according to various embodiments of the present disclosure have been described using specific terms, the specifications and drawings are to be regarded in an illustrative rather than a restrictive sense in order to help understand the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a user interface;
   a communication circuit configured to connect the electronic device to at least one external electronic device though at least one of a first and a second communication channel, the first communication channel comprises a channel established for a voice call with the external electronic device and the second communication channel comprises a channel for sharing contents with the external electronic device;
   a memory; and
   a processor which is electrically connected to the user interface, the communication circuit, and the memory,
   wherein the memory stores instructions for the processor to:
      establish a communication connection with the external electronic device through the first communication channel,
      transmit the contents to the connected external electronic device through the second communication channel during the voice call with the external electronic device through the first communication channel,
      receive at least one of input information made to the contents at the external electronic device and status information of the external electronic device through the second communication channel,
      generate feedback information related to the contents based on at least one of the input information and feedback information, and
      output the feedback information through the user interface.

2. The electronic device of claim 1, wherein the first communication channel comprises the channel established for the voice call through one of a circuit switched (CS) and a packet switched (PS) operator network, and the second communication channel comprises the channel for sharing the contents with the external electronic device via a server.

3. The electronic device of claim 1, wherein the instructions comprise instructions for the processor to:
   control the communication circuit to transmit a request for establishing the second communication channel to a server, and
   communicate directly with the external electronic device through the second communication channel established via the server.

4. The electronic device of claim 1, wherein the memory further stores instructions for the processor to:
   control the communication circuit to transmit a request for establishing the second communication channel to a server,
   check whether an acknowledgement message transmitted by the external electronic device from the server is received in a predetermined time period,
   release, when the acknowledgement message is not received in the predetermined time period, the communication connection,
   check, when the acknowledgement message is received in the predetermined period, whether a second communication channel establishment message is received within a predetermined time period, and
   release, when the second communication channel establishment message is not received in the predetermined time period, the communication connection.

5. The electronic device of claim 1, further comprising:
   a camera module,
   wherein the contents comprise a preview image taken by the camera module, and
   wherein the memory further stores instructions for the processor to:
      control the camera module to execute a camera function concerning the preview image based on status information of the electronic device which is related to the preview image, and
      display the preview image processed by the camera function as feedback information.

6. The electronic device of claim 5,
   wherein the input information comprises a user input made by a user of the external electronic device to a certain area of the preview image, and
   wherein the camera function comprises at least one of adjusting a focal point of the preview image in association with the area and adjusting an out focusing effect of the preview image.

7. The electronic device of claim 1, wherein the memory further stores instructions for the processor to:
   detect turn-off of a screen with the contents at the external electronic device, and
   transmit, when the screen with the contents is switched to a screen without the contents at the external electronic device, at least one of a control signal requesting for displaying the contents on the external electronic device and a control signal requesting for displaying a contents activation icon on the external electronic device.

8. The electronic device of claim 1, wherein the memory further stores instructions for the processor to control, when information indicating that the first and second communication channels cannot be established simultaneously, the communication circuit to release the first communication channel.

9. The electronic device of claim 8,
   wherein the user interface comprises an audio circuit, and wherein the memory further stores instructions for the processor to control, when the first communication channel is released, the communication circuit to transmit a voice signal collected by the electronic device to the external electronic device through the second communication channel and the audio circuit to output the voice signal received from the external electronic device through the second communication channel.

10. The electronic device of claim 1, wherein the status information of the external electronic device comprises information indicating whether the contents are displayed on the user interface of the external electronic device, information indicating whether a user's face contacts the external electronic device, and interactive user input information made to the contents displayed by the external electronic device.

11. An electronic device comprising:
a user interface configured to display at least one screen;
a communication circuit configured to connect the electronic device to at least one external electronic device through at least one of a first and a second communication channel, the first communication channel comprises a channel established for a voice call with the external electronic device and the second communication channel comprises a channel for sharing contents with the external electronic device;
a memory; and
a processor which is electrically connected to the user interface, the communication circuit, and the memory,
wherein the memory stores instructions for the processor to:
establish a communication connection with the external electronic device through the first communication channel,
receive the contents from the external electronic device through the second communication channel during the voice call with the external electronic device through the first communication channel,
output the contents through the user interface, and
transmit at least one of input information made to the contents at the external electronic device and status information of the external electronic device through the second communication channel.

12. The electronic device of claim 11, wherein the memory further stores instructions for the processor to:
control the communication circuit to receive a request for establishing the second communication channel transmitted by the external electronic device from a server, and
communicate directly with the external electronic device through the second communication channel with assistance of the server.

13. The electronic device of claim 11, wherein the memory further stores an instruction for the processor to transmit, when a screen without the contents is turned off or the screen with the contents is switched to a screen without the contents at the electronic device, information indicating that the contents are not shared as status information of the electronic device to the external electronic device.

14. The electronic device of claim 13, wherein the memory further stores instructions for the processor to:
control the user interface to display, when the screen with the contents is switched to a screen without the contents at the electronic device, an activation item to display the contents again on the switched screen, and switch the screen without the contents to the screen with the contents in response to a user input made to the activation item.

15. The electronic device of claim 11, wherein the memory further stores instructions for the processor to:
detect whether a user's face contacts the electronic device by means of the user interface or a sensor circuit, and
transmit, if the user's face contacts the electronic device, information indicating that the user of the electronic device is not paying attention to the contents as status information of the electronic device to the external electronic device.

16. The electronic device of claim 11,
wherein the contents comprise a preview image taken by a camera module of the external electronic device, and
wherein the memory further stores an instruction for the processor to:
transmit a user's interactive input made to the preview image as status information of the electronic device to the external electronic device, and
receive contents displayed on the external electronic device according to a function execution of the camera module based on the status information of the electronic device.

17. The electronic device of claim 11, wherein the memory further stores instructions for the processor to:
receive information on sight line of a user of the electronic device which is oriented to at least an area of the contents, and
transmit the user's sight line information as status information of the electronic device to the external electronic device.

18. The electronic device of claim 11, further comprising:
an audio circuit,
wherein the memory further stores instructions for the processor to:
control the communication circuit to transmit, when the first communication channel is released, a voice signal collected by the electronic device to the external electronic device through the second channel, and
control the audio circuit to output the voice signal received from the external electronic device.

19. An electronic device comprising:
a communication circuit configured to establish a communication channel for sharing contents between a first external electronic device and a second external electronic device;
a memory; and
a processor which is electrically connected with the communication circuit and the memory,
wherein the memory stores instructions for the processor to control:
receiving the contents from the first external electronic device through the communication circuit, during between a voice call the first external electronic device and the second electronic device,
transmitting the received contents to the second external electronic device through the communication circuit,
receiving, from the second electronic device, at least one of input information made to the contents at the second electronic device and status information of the second electronic device, through the communication circuit, and transmitting the received at least one of the input information and the status information to the first electronic device through the communication circuit.

20. The electronic device of claim 19, wherein the memory further stores an instruction for the processor to:
receive a request for establishing the communication channel from the first external electronic device,
forward the request to the second external electronic device,
relay an acknowledgement message received from the second external electronic device in response to the request to the first external electronic device,
establish the communication channel, and
perform authenticating at least one of the first and second external electronic devices in association with the communication channel.

* * * * *